US012199715B2

(12) United States Patent
Zimmerman

(10) Patent No.: US 12,199,715 B2
(45) Date of Patent: *Jan. 14, 2025

(54) SMALL CELL BEAM-FORMING ANTENNAS

(71) Applicant: Outdoor Wireless Networks LLC, Claremont, NC (US)

(72) Inventor: Martin L. Zimmerman, Chicago, IL (US)

(73) Assignee: Outdoor Wireless Networks LLC, Claremont, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/195,425

(22) Filed: May 10, 2023

(65) Prior Publication Data

US 2023/0275634 A1 Aug. 31, 2023

Related U.S. Application Data

(63) Continuation of application No. 16/689,282, filed on Nov. 20, 2019, now Pat. No. 11,689,263, which is a
(Continued)

(51) Int. Cl.
*H04B 7/06* (2006.01)
*H01Q 3/26* (2006.01)
(Continued)

(52) U.S. Cl.
CPC ......... *H04B 7/0617* (2013.01); *H01Q 3/2605* (2013.01); *H01Q 3/267* (2013.01);
(Continued)

(58) Field of Classification Search
CPC ........ H04B 7/0617; H04B 7/04; H04B 7/086; H04B 7/10; H01Q 3/2605; H01Q 3/267;
(Continued)

(56) References Cited

U.S. PATENT DOCUMENTS

2002/0113743 A1   8/2002  Judd et al.
2005/0249151 A1   11/2005 Takano
(Continued)

FOREIGN PATENT DOCUMENTS

CN    103606755 A    2/2014
CN    103765940 A    4/2014
CN    104143698      11/2014

OTHER PUBLICATIONS

"Datasheet for SBA Smart Omni, Long, 2.3-2.4 GHz, Airspan P/Ns: Tilt 0°: SBAL-2.3-DUAL-1", Airspan Networks Inc., Nov. 2015.
(Continued)

*Primary Examiner* — Zhitong Chen
(74) *Attorney, Agent, or Firm* — Myers Bigel, P.A.

(57) ABSTRACT

A small cell cellular base station includes an eight port radio and an eight-port base station antenna that has four linear arrays of dual-polarized radiating elements. Each of the linear arrays has a different azimuth boresight pointing direction and each dual-polarized radiating element includes first and second radiators that have respective directional radiation patterns. The radio is configured to determine and apply a first set of amplitude and phase weights to RF signals that are received through the eight ports of the antenna, and to apply a second set of amplitude and phase weights to RF signals that are output by the radio to the eight ports of the antenna.

11 Claims, 16 Drawing Sheets

Related U.S. Application Data continuation of application No. 15/679,450, filed on Aug. 17, 2017, now Pat. No. 10,505,609.

(60) Provisional application No. 62/519,370, filed on Jun. 14, 2017.

(51) Int. Cl.

| | | |
|---|---|---|
| *H01Q 21/20* | (2006.01) | |
| *H01Q 25/00* | (2006.01) | |
| *H04B 7/04* | (2017.01) | |
| *H04W 16/28* | (2009.01) | |
| *H04W 84/04* | (2009.01) | |
| *H04W 88/08* | (2009.01) | |

(52) U.S. Cl.
CPC ......... *H01Q 21/205* (2013.01); *H01Q 25/001* (2013.01); *H04B 7/04* (2013.01); *H04W 16/28* (2013.01); *H04W 84/045* (2013.01); *H04W 88/08* (2013.01)

(58) Field of Classification Search
CPC .... H01Q 21/205; H01Q 25/001; H01Q 1/246; H01Q 1/38; H01Q 1/50; H01Q 9/285; H01Q 19/106; H01Q 21/0006; H01Q 21/293; H04W 16/28; H04W 84/045; H04W 88/08

See application file for complete search history.

(56) References Cited

U.S. PATENT DOCUMENTS

| | | | | |
|---|---|---|---|---|
| 2006/0192710 | A1* | 8/2006 | Schieblich | ............. H04B 17/21 455/67.11 |
| 2010/0119002 | A1 | 5/2010 | Hartenstein | |
| 2014/0320377 | A1* | 10/2014 | Cheng | .................... H01Q 21/24 343/893 |
| 2015/0188222 | A1* | 7/2015 | Petersson | ................. H01Q 3/26 342/373 |
| 2015/0333885 | A1 | 11/2015 | Athley et al. | |
| 2016/0135180 | A1 | 5/2016 | Yuan et al. | |
| 2017/0223102 | A1* | 8/2017 | Lee | ....... H01Q 19/185 |
| 2017/0317725 | A1* | 11/2017 | Lea | ......... H01Q 21/24 |
| 2023/0216215 | A1* | 7/2023 | Corman | ................. H04W 72/23 455/121 |

OTHER PUBLICATIONS

"Bernhard Schulz, "LTE Transmission Modes and Beamforming", White Paper, Rohde & Schwarz, Jul. 2015".
"Bernhard Schulz, White Paper, LTE Transmission Modes and Beamforming, Oct. 2011".
"Chuck Powell, "Technical Analysis: Beamforming vs. MIMO Antennas", White Paper, Radio Frequency Systems, Mar. 2014".
"English Translation of Text Portion of Office Action corresponding to Chinese Application No. 201810345806.2 dated Dec. 2, 2020".
"English Translation of Text Portion of Office Action corresponding to Chinese Application No. 201810345806.2 dated Jun. 3, 2021".
"Extended European Search Report, corresponding to European Patent Application No. 18163013.8-1205, dated Sep. 27, 2018, 7 pages".
"Lajos Hanzo, "Intelligent Antenna Arrays and Beamforming," 3G, HSPA and FDD versus TDD Networking: Smart Antennas and Adaptive Modulation, 2nd Edition, Mar. 31, 2008, pp. 151-214".
"Office Action corresponding to Chinese Application No. 201810345806.2 dated Nov. 8, 2019".
"Wang, J., Lv, Z. and Li X., 2014, Analysis of MIMO Diversity Improvement Using Circular Polarized Antenna, International Journal of Antennas and Propagation, 2014".

\* cited by examiner

SMALL CELL BEAM-FORMING ANTENNAS

CROSS-REFERENCE TO RELATED APPLICATIONS

This application claims priority under 35 U.S.C. § 120 as a continuation of U.S. patent application Ser. No. 16/689,282, filed Nov. 20, 2019, which in turn is a continuation application of U.S. patent application Ser. No. 15/679,450, filed Aug. 17, 2017, which in turn claims priority to U.S. Provisional Application No. 62/519,370, filed Jun. 14, 2017 and entitled "SMALL CELL BEAM-FORMING ANTENNAS," the entire contents of each of which are incorporated by reference herein for all purposes.

FIELD

The present invention relates to cellular communications systems and, more particularly, to base station antennas for small cell base stations.

BACKGROUND

Cellular communications systems are well known in the art. In a typical cellular communications system, a geographic area is divided into a series of regions that are referred to as "cells," and each cell is served by a "macrocell" base station. Each cell may, for example, have an area on the order of 1-50 km², with the cell size depending upon, among other things, the terrain and population density. The base station may include baseband equipment, radios and antennas that are configured to provide two-way radio frequency ("RF") communications with fixed and mobile subscribers ("users") that are positioned throughout the cell. The base station antennas are often mounted on a tower or other raised structure, with the radiation beam ("antenna beam") that is generated by each antenna directed outwardly to serve the entire cell or a portion ("sector") thereof. Typically, a base station antenna includes one or more phase-controlled arrays of radiating elements, with the radiating elements arranged in one or more vertical columns when the antenna is mounted for use. Herein, "vertical" refers to a direction that is generally perpendicular relative to the plane defined by the horizon.

In order to increase capacity, cellular operators have been deploying so-called "small cell" base stations. A small cell base station refers to a lower power base station that may operate in the licensed and/or unlicensed spectrum that serves a much smaller area than a typical macrocell base station. Herein, the term "small cell" is used broadly to refer to base stations that serve smaller areas than conventional macrocell base stations, and thus the term "small cell" encompasses small cell, microcell, picocell and other base stations that serve small geographic regions. Small cell base stations may be used, for example, to provide cellular coverage to high traffic areas within a macrocell, which allows the macrocell base station to offload much or all of the traffic in the vicinity of the small cell to the small cell base station. Small cell base stations may be particularly effective in Long Term Evolution ("LTE") cellular networks in efficiently using the available frequency spectrum to maximize network capacity at a reasonable cost.

FIG. 1 is a schematic diagram of a conventional small cell base station 10. The base station 10 includes an antenna 20 that may be mounted on a raised structure 30. In the depicted embodiment, the structure 30 is a small antenna tower, but it will be appreciated that a wide variety of mounting locations may be used including, for example, utility poles, buildings, water towers and the like. Typically, the antenna 20 of a small cell base station is designed to have an omnidirectional antenna pattern in the azimuth plane, meaning that the antenna beam generated by the antenna 20 may extend through a full 360 degree circle in the azimuth plane, and may have a suitable beamwidth (e.g., 10-30 degrees) in the elevation plane. The antenna beam may be slightly down-tilted in the elevation plane (which may be a physical or electronic downtilt) to reduce spill-over of the antenna beam of the small cell base station antenna into regions that are outside the small cell and also for reducing interference between the small cell base station and the overlaid macrocell base station.

The small cell base station 10 further includes base station equipment such as one or more baseband units 40 and radios 42. While the radio 42 is shown as being co-located with the baseband equipment 40 at the bottom of the antenna tower 30, it will be appreciated that in other cases the radio 42 may be a remote radio head that is mounted on the antenna tower 30 adjacent the antenna 20. As is known to those of skill in the art, the baseband unit 40 may receive data from another source such as, for example, a backhaul network (not shown) and may process this data and provide a data stream to the radio 42. The radio 42 may generate RF signals that include the data encoded therein and may amplify and deliver these RF signals to the antenna 20 for transmission via a cabling connection 44. It will also be appreciated that the small cell base station 10 of FIG. 1 may typically include various other equipment (not shown) such as, for example, a power supply, back-up batteries, a power bus, controllers and the like.

SUMMARY

Pursuant to embodiments of the present invention, small cell base stations are provided that include a base station antenna having first through eighth ports and first through fourth linear arrays of dual-polarized radiating elements, where at least two of the first through fourth linear arrays have different azimuth boresight pointing directions when the base station antenna is mounted for use, and wherein each dual-polarized radiating element includes first and second radiators that have respective directional radiation patterns. The small cell base station further includes a radio having first through eighth radio ports that are connected to the respective first through eighth ports of the base station antenna. The radio is configured to determine and apply a first set of amplitude and phase weights to RF signals that are received from the respective first through eighth ports of the base station antenna, and to apply a second set of amplitude and phase weights to RF signals that are output by the radio to the first through eighth ports of the base station antenna.

In some embodiments, the amplitude and phase weights of the first and second sets of amplitude and phase weights may be determined on a time slot-by-time slot basis.

In some embodiments, the amplitude and phase weights of the second set of amplitude and phase weights may be the complex conjugates of the respective amplitude and phase weights of the first set of amplitude and phase weights.

In some embodiments, the azimuth boresight pointing direction of the first linear array may be offset from the azimuth boresight pointing direction of the second through fourth linear arrays by about 90 degrees, about 180 degrees and about 270 degrees, respectively.

In some embodiments, the base station may further include a feed network that connects all of the first radiators of each of the first through fourth linear arrays to the first through fourth radio ports, respectively, and that connects all of the second radiators of each of the first through fourth linear arrays to the fifth through eighth radio ports, respectively.

In some embodiments, the base station antenna may be configured to transmit as a multi-input-multi-output antenna using the first radiators to transmit a first data stream and using the second radiators to simultaneously transmit a second data stream that is different than the first data stream. In such embodiments, the first and second data streams may be part of a composite data stream that is transmitted to a user.

In some embodiments, the base station antenna may further include first through fourth backplanes that together define a tubular reflector assembly. The tubular reflector assembly may have, for example, a generally rectangular cross-section in the azimuth plane.

In some embodiments, the base station antenna may further include a ninth port and a calibration element that is connected to the ninth port, where the ninth port of the base station antenna is connected to a ninth radio port.

In some embodiments, the first linear array may point in a first direction and the third linear array may point in a third direction that is substantially opposite the first direction. In such embodiments, the second linear array may point in a second direction and the fourth linear array may point in a fourth direction that is substantially opposite the second direction. The first direction may be angularly offset from the second direction by about 90 degrees in some embodiments. In other embodiments, the first direction may be the same as the second direction.

Pursuant to further embodiments of the present invention, base station antennas are provided that include first through eighth ports and a plurality of radiating elements that are arranged as first through fourth linear arrays of radiating elements, each radiating element having a half-power azimuth beamwidth of less than 120 degrees and comprising a first radiator that radiates at a first polarization and a second radiator that radiates at a second polarization that is orthogonal to the first polarization, where the radiating elements of the first linear array are mounted to have a first azimuth boresight pointing direction, the radiating elements of the second linear array are mounted to have a second azimuth boresight pointing direction, the radiating elements of the third linear array are mounted to have a third azimuth boresight pointing direction, and the radiating elements of the fourth linear array are mounted to have a fourth azimuth boresight pointing direction, where at least two of the first through fourth azimuth boresight pointing directions differ from each other. These base station antennas further include a feed network that connects each of the first polarization radiators of the first linear array to the first port, connects each of the second polarization radiators of the first linear array to the second port, connects each of the first polarization radiators of the second linear array to the third port, connects each of the second polarization radiators of the second linear array to the fourth port, connects each of the first polarization radiators of the third linear array to the fifth port, connects each of the second polarization radiators of the third linear array to the sixth port, connects each of the first polarization radiators of the fourth linear array to the seventh port, and connects each of the second polarization radiators of the fourth linear array to the eighth port.

In some embodiments, the first through fourth azimuth boresight pointing directions may differ from each other by at least 50 degrees. In an example embodiment, the first through fourth azimuth boresight pointing directions may be approximately 0 degrees, 90 degrees, 180 degrees and 270 degrees, respectively. The base station antenna may be provided in combination with an eight port beam-forming radio, where the first through eighth ports of the base station antenna are coupled to respective first through eighth radio ports of the beam-forming radio. The base station antenna may be configured to operate in both a broadcast mode in which the base station antenna generates an omnidirectional antenna beam and in a service beam mode in which the base station antenna generates at least one directional antenna beam. In the service beam mode the first through fourth linear arrays may be configurable to simultaneously generate at least four independent antenna beams. In the broadcast mode the beam-forming radio may be configured to subdivide an RF signal into eight identical sub-components and to output the sub-components through the respective first through eighth radio ports.

In some embodiments, the base station antenna may further include a ninth port and a calibration element that is connected to the ninth port, where the ninth port of the base station antenna is connected to a ninth radio port of the beam-forming radio.

Pursuant to still further embodiments of the present invention, methods of operating a base station antenna are provided. The base station antenna includes a plurality of linear arrays of dual-polarized radiating elements, at least two of the linear arrays having different azimuth boresight pointing directions. Pursuant to these methods, an RF signal is received from a user through the plurality of linear arrays during a first time slot of a time division multiplex system. The received RF signal is passed to a beam-forming radio. A first set of amplitude and phase weights are determined, the first set of amplitude and phase weights including a respective amplitude weight and a respective phase weight for each linear array at each of a first polarization and a second polarization. The first set of amplitude and phase weights are applied to the received RF signals. A second set of amplitude and phase weights are determined, the second set of amplitude and phase weights including a respective amplitude weight and a respective phase weight for each linear array at each of the first polarization and the second polarization. The second set of amplitude and phase weights are then applied to one or more RF signals that are transmitted to the user through the plurality of linear arrays.

In some embodiments, the plurality of linear arrays may comprise four linear arrays, and at least two of the four linear arrays may point in opposite directions.

In some embodiments, the plurality of linear arrays comprises four linear arrays, and the azimuth pointing directions of each linear array may be offset from the azimuth pointing directions of each of the three other linear arrays by about 90 degrees, 180 degrees and 270 degrees, respectively.

In some embodiments, the antenna may include a total of four linear arrays and first through eighth ports, where each radiating element includes a first radiator that radiates at a first polarization and a second radiator that radiates at a second polarization that is orthogonal to the first polarization, and the antenna further comprises a feed network that connects each of the first polarization radiators of the first linear array to the first port, connects each of the second polarization radiators of the first linear array to the second port, connects each of the first polarization radiators of the second linear array to the third port, connects each of the second polarization radiators of the second linear array to the fourth port, connects each of the first polarization radiators of the third linear array to the fifth port, connects each of the second polarization radiators of the third linear array to the sixth port, connects each of the first polarization radiators of the fourth linear array to the seventh port, and connects each of the second polarization radiators of the fourth linear array to the eighth port.

In some embodiments, the base station antenna may further include a ninth port and a calibration element that is connected to the ninth port.

In some embodiments, the one or more RF signals that are transmitted to the user through the plurality of linear arrays may comprise a first RF signal that is transmitted by the first radiators of the first through fourth linear arrays and a second RF signal that is transmitted by the second radiators of the first through fourth linear arrays.

In some embodiments, the one or more RF signals that are transmitted to the user through the plurality of linear arrays may comprise a first RF signal that is transmitted by the first radiators of the first and second linear arrays, a second RF signal that is transmitted by the first radiators of the third and fourth linear arrays, a third RF signal that is transmitted by the second radiators of the first and second linear arrays, and a fourth RF signal that is transmitted by the second radiators of the third and fourth linear arrays.

DETAILED DESCRIPTION

Figure 1:
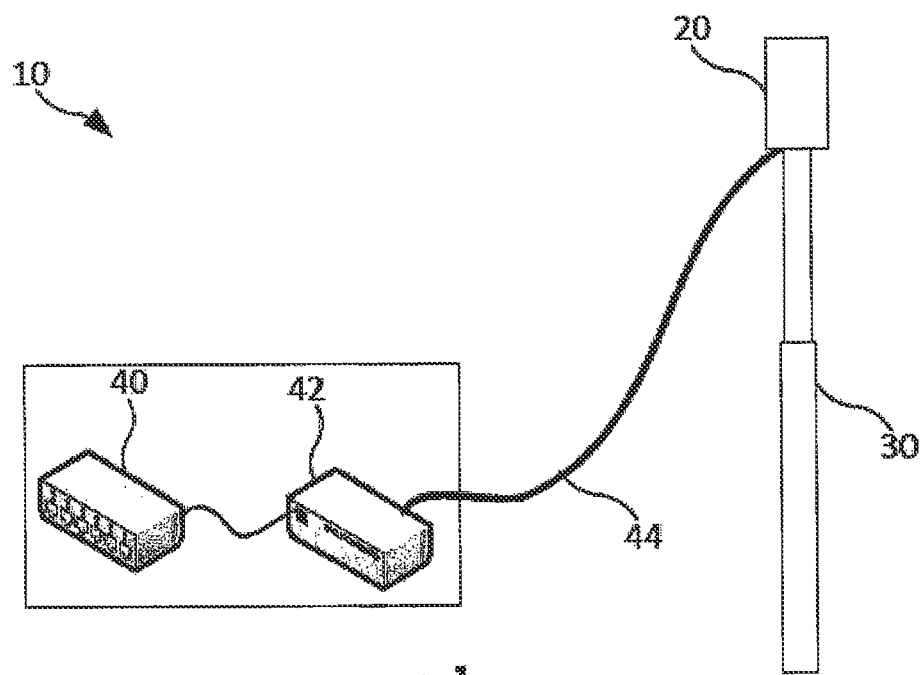
FIG. 1 is a highly simplified schematic diagram illustrating a conventional small cell base station.

Pursuant to embodiments of the present invention, small cell beam-forming base station antennas are provided that are suitable for use in LTE time division duplex ("TDD") and frequency division duplex ("FDD") systems. The small cell beam-forming antennas according to embodiments of the present invention may have a very small form factor and may be mounted on light posts, electric power poles, telephones poles and the like. These small cell beam-forming antennas may provide full 360° coverage in the azimuth plane using multiple linear arrays or "columns" of radiating elements that have directional radiation patterns. The small cell antennas according to embodiments of the present invention may form directional antenna beams having relatively high gain on a time slot-by-time slot basis and may be used in multi-input-multi-output ("MIMO") and/or beam-forming modes of operation.

In some embodiments, the beam-forming antennas according to embodiments of the present invention may include four linear arrays of radiating elements that are mounted on the four main faces of a rectangular tubular reflector assembly. The azimuth boresight pointing direction of each linear array may be offset by approximately 90° from the azimuth boresight pointing directions of two adjacent linear arrays. The radiating elements in each linear array may comprise dual-polarized radiating elements such as, for example, slant −45°/+45° cross-dipole radiating elements. The radiating elements may have directional patterns in the azimuth plane having, for example, azimuth half power beamwidths of between 50-120°. Each of the four linear arrays may connect to two ports (one for each polarization) on the antenna, and the eight ports on the antenna may connect to corresponding radio ports on an eight-port beam-forming radio. Each linear array may form a pair of directional antenna beams, one for each orthogonal polarization. Each antenna beam may, for example, provide coverage for over ninety degrees in the azimuth plane.

Digital beamforming may be performed so that RF signals are transmitted and received through two or more of the linear arrays, with appropriate amplitude and phase weighting provided for each linear array, in order to generate a relatively narrow antenna beam in the azimuth plane that has a high gain. For example, the same RF signal may be provided to two adjacent linear arrays, with the sub-component of the RF signal that is fed to each linear array amplitude and phase weighted so that together the two linear arrays form a single antenna beam that is pointed at a user that is located between the azimuth boresight pointing directions of the two linear arrays. The remaining two linear arrays may also be excited (potentially at much lower power levels) in order to generate one or more nulls within the antenna beam in the location(s) of sources of potentially interfering signals, or to provide a second antenna beam that illuminates the user by reflecting off various structures.

The antennas according to embodiments of the present invention may be used in LTE-TDD systems as small cell base station antennas. While eight-port beam-forming antennas are currently used in LTE-TDD systems, these antennas are "panel" antennas that have four columns of dual-polarized radiating elements mounted on a common, planar backplane so that all four columns face in the same direction (i.e., have the same azimuth boresight pointing direction).

These panel antennas are typically used as sector antennas in macrocell base station antennas and may not be well-suited for many small cell applications—particularly in dense urban environments—where omnidirectional coverage is often desired. In contrast, the beam-forming antennas according to embodiments of the present invention may have a plurality of directional (and hence higher gain) linear arrays that together provide omnidirectional coverage.

The small cell antennas according to certain embodiments of the present invention may be used to as MIMO antennas and/or as beam-forming antennas. For example, the above-described four column antenna having linear arrays of dual-polarized radiating elements that are offset by 90° in the azimuth plane may be used as a MIMO antenna for users that are close to the small cell base station and as a beam-forming antenna for serving users near the outer edge of the small cell. In one configuration, the antenna may implement 2×MIMO using the two orthogonal polarizations and use all four columns at each polarization for beam-forming to create high gain directional beams in the azimuth plane. In another configuration, the antenna may implement 4×MIMO using the first and second columns (at each of two orthogonal polarizations) to transmit first and second MIMO data streams and using the third and fourth columns (at each of two orthogonal polarizations) to transmit third and fourth MIMO data streams. The sub-components of an RF signal that are fed to the first and second columns may be amplitude-weighted and phase-weighted to narrow the two antenna beams formed by the first and second columns, and the third and fourth columns may likewise be amplitude-weighted and phase-weighted to narrow the antenna beam formed by the third and fourth columns.

The small cell antennas according to embodiments of the present invention may be used in LTE Transmission Mode 8 ("LTE TM8 mode"), which is a dual layer beam-forming mode. A conventional beam-forming radio may be used with such an antenna to demodulate and process the RF signals received from a user during a particular TDD time slot to determine amplitude and phase weights for the signals received at the eight ports of the antenna that will result in a combined received signal that optimizes a parameter such as the received signal-to-noise ratio, bit error rate or the like. The complex conjugates of the amplitude and phase weights may then be used to generate amplitude and phase weights for RF signals that are transmitted from the base station to that particular user. A similar process may be used in FDD systems except that the downlink amplitude and phase weights may be further modified to correct for differences in the channel model that result from the difference between the frequencies used for the uplink and downlink transmissions.

Several conventional beam-forming antennas as well as example embodiments of the invention will now be discussed in more detail with reference to the attached drawings.

Beam-forming antennas refer to antennas that have multiple columns of one or more radiating elements that are fed by different ports of a radio. A radio may modulate an RF signal and then send it to transceivers for each output port of the radio ("radio port"). The amplitude and phase of the RF signal for each radio port may be set by the radio so that the columns of radiating elements work together to form a more focused, higher gain antenna beam that has a narrowed beamwidth in the azimuth plane (or two such antenna beams if the antenna has dual-polarized radiating elements, namely an antenna beam for each polarization). In other cases the antenna may be arranged so that there are multiple input ports for sub-arrays in the elevation direction as well as azimuth direction so that the antenna beam may be narrowed in both the azimuth and elevation planes. The antenna beams may be changed on a time slot-by-time slot basis in a TDD transmission scheme in order to increase the antenna gain in the direction of selected users during each time slot. The column spacing (i.e., the horizontal distance between adjacent vertically-oriented linear arrays of radiating elements) of a beam-forming antenna is typically relatively small. Since beam-forming antennas have the ability to narrow the azimuth (and perhaps elevation) beamwidth and to scan the antenna beam in the direction of a user, they may exhibit higher antenna gains and support increased capacity. Beam-forming antennas typically include a calibration network so that the amplitude and phase relationships between adjacent columns may be tightly controlled. The calibration network allows the radio to compensate for differences in amplitude and phase between the jumper cables that connect the multiple radio ports to the corresponding antenna ports.

Figure 2:
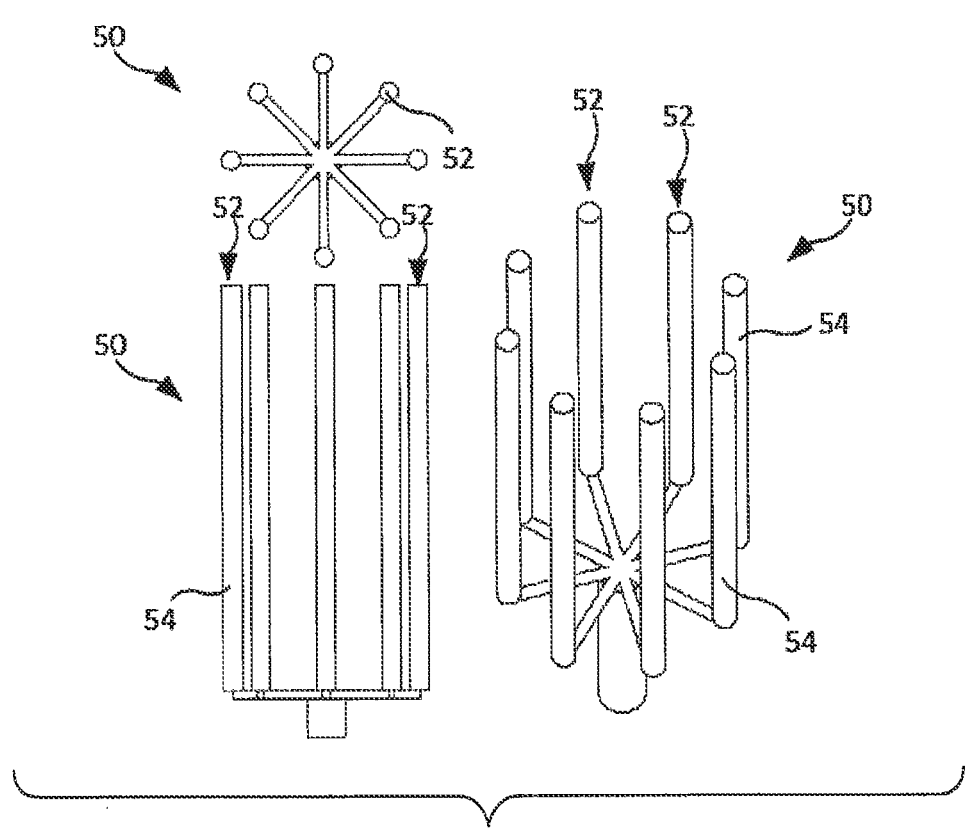
FIG. 2 is a collage including a schematic front view, top view and perspective view of the linear arrays of a prior art base station antenna.

FIG. 2 is a collage that includes a schematic front view, a top view and a perspective view of a prior art multi-column small cell antenna 50. As shown in FIG. 2, the antenna 50 includes eight linear arrays 52 of vertically-disposed omni-directional dipoles (the individual dipoles are not visible in FIG. 2). Each linear array 52 had its own radome 54 to provide environmental protection, and the eight radomes 54 are arranged to define a cylinder. The antenna 50 is a dual-band antenna, with four of the linear arrays 52 configured to operate at 1.9 GHz and the other four linear arrays 52 configured to operate at 2.6 GHz. The diameter of the antenna 50 is about six feet, which allowed each linear array 52 to be highly decorrelated with respect to the other linear arrays 52 operating in the same frequency band. However, given the large spacing between the linear arrays 52, the antenna 50 was not operable as a beam-forming antenna. The antenna 50 used spatial diversity to improve performance.

Figure 3:
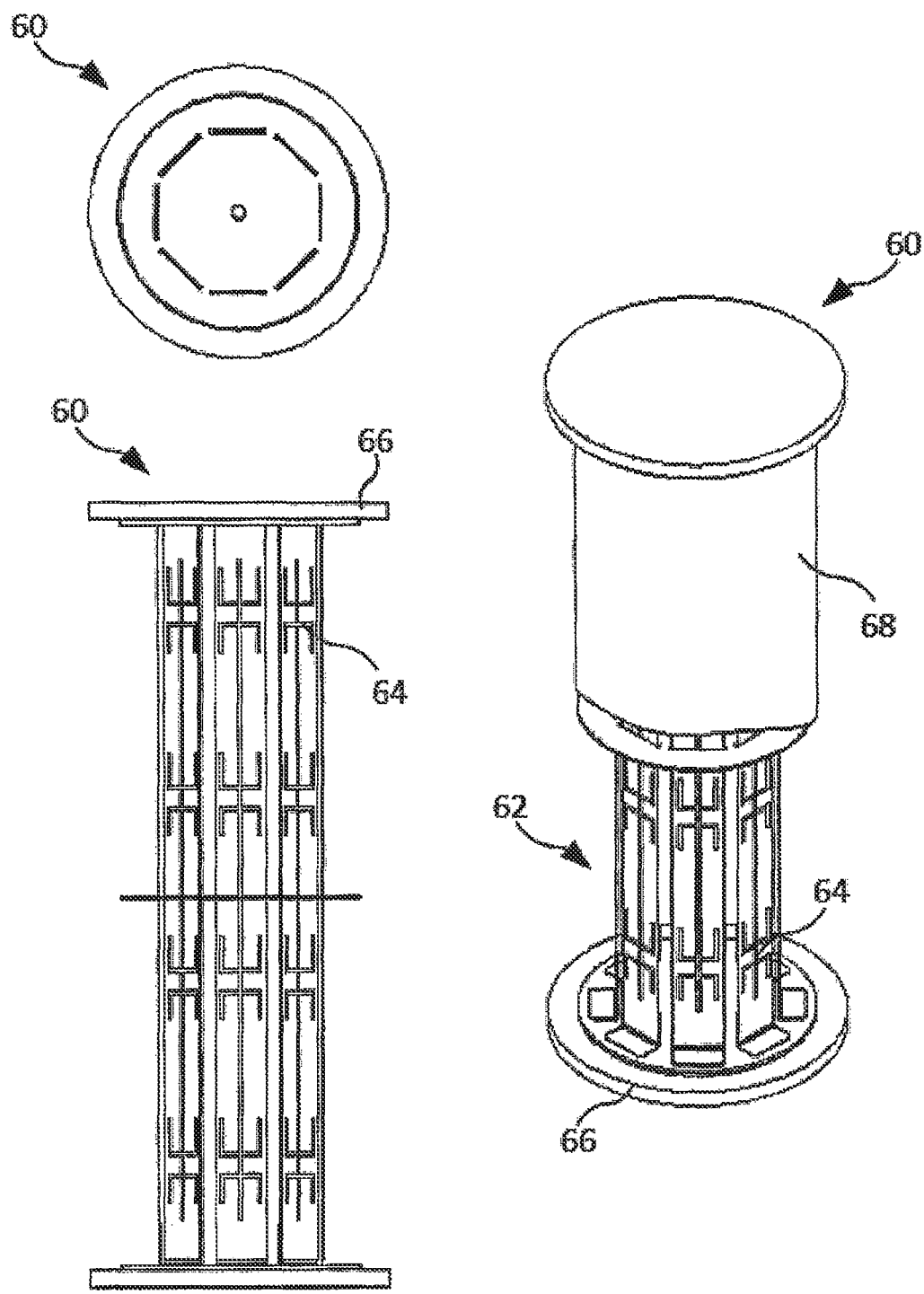
FIG. 3 is a collage including a schematic front view, top view and perspective view of a conventional beamforming small cell base station antenna with the radome thereof partially shown in the perspective view.

FIG. 3 is a collage of a top view, a side view and a shadow perspective view of another conventional small cell beam-forming antenna 60 that was designed to operate in 3G TD-SCMA systems. As shown in FIG. 3, the beam-forming antenna 60 has eight columns (or linear arrays) 62 of vertically polarized radiating elements 64 that are arranged in an octagon around the circumference of a support structure 66. The linear arrays 62 are spaced sufficiently close together so that the antenna 60 can use beam-forming techniques to feed multiple columns together to form narrowed antenna beams. A circular radome 68 is mounted over the support structure 66 and the linear arrays 62 to provide environmental protection. The individual radiating elements 64 have omnidirectional patterns, and hence the antenna 60 could not form high directivity antenna beams. Each linear array 62 of radiating elements 64 is driven at full power.

Figure 4:
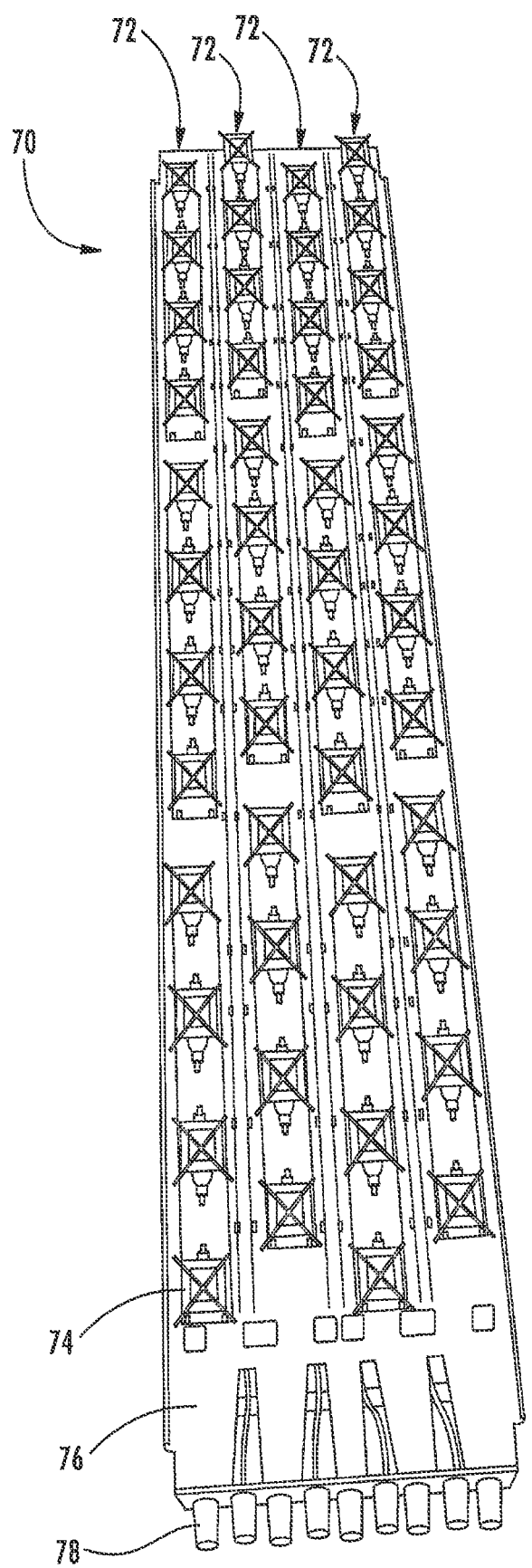
FIG. 4 is a perspective view of a conventional panel style beam-forming antenna with the radome removed.

Later beam-forming antennas were implemented as panel antennas. These antennas typically included multiple columns of radiating elements mounted to extend forwardly from a planar back plane. FIG. 4 is a perspective view of one such beam-forming panel antenna 70. As shown in FIG. 4, the beam-forming antenna 70 has four columns 72 of dual-polarized radiating elements 74 that are mounted on a planar backplane 76. Each column 72 of radiating elements 74 has the same azimuth boresight pointing angle. The antenna 70 includes a total of eight ports 78, namely two ports for each column (a port for each polarization), along with a ninth port 78 for calibration. A radome (not shown) is mounted over the radiating elements 74 to provide environmental protection. Panel beam-forming antennas such as the antenna 70 of FIG. 4 may provide good performance. These panel antennas may be used as sector antennas on a macrocell base station or may be mounted on the sides of buildings or other structures. There are many small cell applications where full 360 degree coverage in the azimuth plane is desired. Panel beam-forming antennas tend to be unsuitable for such applications as they do not provide omnidirectional coverage in the azimuth plane.

One possible technique for fabricating a beam-forming antenna that provides omnidirectional coverage would be to mount two side-by-side vertically-oriented linear arrays of radiating elements on each side of a tube having a triangular horizontal cross-section. This approach, in essence, provides three separate beam-forming antennas that each provide coverage to a 120° sector in the azimuth plane to provide full 360° coverage. An example of such a beam-forming antenna 100 is illustrated in FIG. 5A.

Figure 5A:
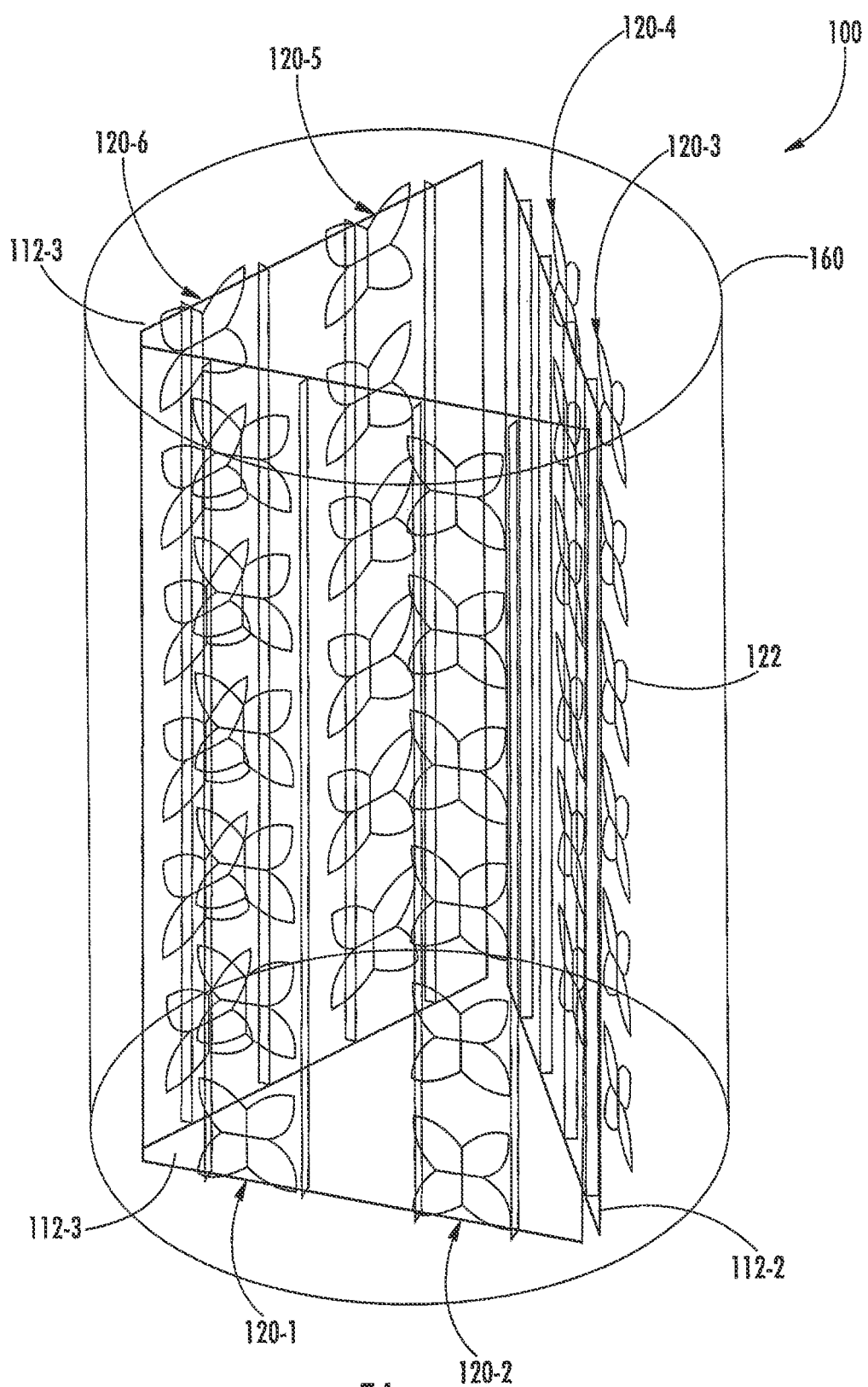
FIG. 5A is a schematic diagram illustrating a beam-forming small cell base station antenna according to embodiments of the present invention.

As shown in FIG. 5A, the beam-forming antenna 100 has a tubular triangular reflector assembly 110 that includes three backplanes 112-1, 112-2, 112-3. Six vertically-oriented linear arrays 120-1 through 120-6 of dual-polarized radiating elements 122 are mounted on the reflector assembly 110, with two linear arrays 120 provided per backplane 112. Each backplane 112 may comprise, for example, a reflector that serves as a ground plane for the radiating elements 122 of the linear arrays 120 mounted thereon. A single monolithic structure (e.g., a sheet of metal that is bent to form a tube having a triangular horizontal cross-section) may be used to form all three backplanes 112. Herein, when multiple like or similar elements are provided, they may be labelled in the drawings using a two part reference numeral. Such elements may be referred to herein individually by their full reference numeral (e.g., backplane 112-2) and may be referred to collectively by the first part of their reference numeral (e.g., the backplanes 112).

Two vertically-oriented linear arrays 120 are mounted on each backplane 112. In the depicted embodiment, each linear array 120 includes a total of six dual-polarized radiating elements 122. The dual-polarized radiating elements 122 may extend forwardly from the respective backplanes 112. The linear arrays 120 on each backplane 112 may be spaced close together. For example, the linear arrays 120 on each backplane 112 may be spaced apart by about a half wavelength of a center frequency of the operating frequency range of the linear arrays 120.

The antenna 100 may have two ports for each linear array 120 (one for each polarization, for a total of twelve ports. The two linear arrays 120 on each backplane 112 may perform independent beam-forming in some embodiments, while beam-forming may be performed using all six linear arrays 120 in other embodiments.

In small cell applications in dense urban environments, RF signals transmitted and received by the antenna 100 may be subject to a high degree of scattering. Such scattering tends to enhance the degree of decorrelation between adjacent ones of the linear arrays 120, allowing linear arrays that are spaced closely together (as is desired when beam-forming is performed) to also operate in a MIMO mode (which needs decorrelated antennas, and hence greater spatial separation). For example, when used in a dense urban environment, the antenna 100 may operate as a 2×MIMO antenna by using each polarization to transmit a different data stream. The two linear arrays 120 on each backplane 112 may operate together to perform beam-forming. In some cases, beam-forming could be performed using linear arrays 120 from multiple backplanes, and/or 4×MIMO transmissions could be supported by transmitting data streams using multiple sets of linear arrays 120 (e.g., three linear arrays 120 could be used to generate a first antenna beam at a first polarization and a second antenna beam at a second polarization, while the remaining three linear arrays 120 could be used to generate a third antenna beam at the first polarization and a fourth antenna beam at the second polarization to support 4×MIMO).

Figure 5B:
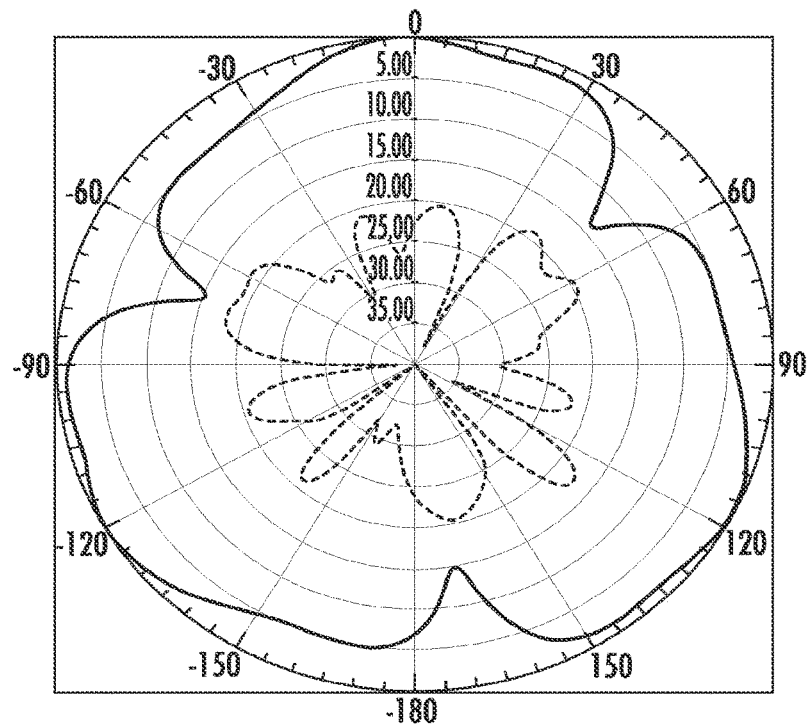
FIGS. 5B and 5C are graphs illustrating azimuth and elevation cross-sections of the antenna beam of the small cell antenna of FIG. 5A.
Figure 5C:
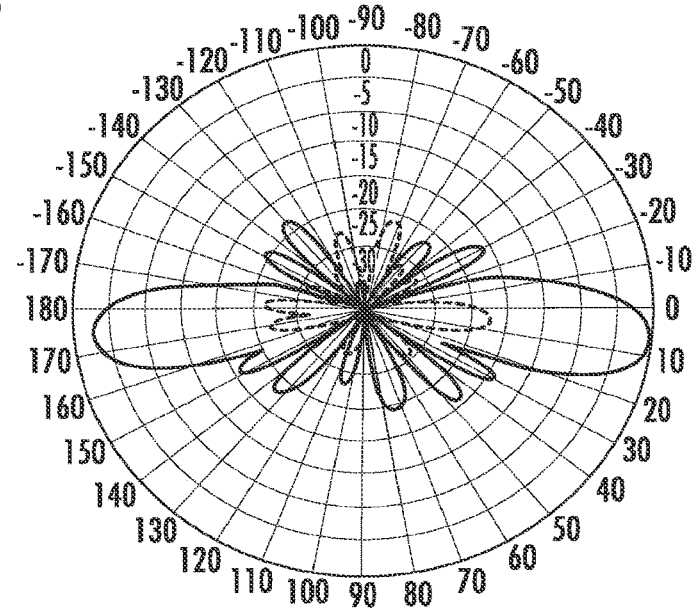

FIGS. 5B and 5C are graphs illustrating azimuth and elevation cross-sections of the antenna beam generated by the small cell antenna of FIG. 5A when all six linear arrays 120 are simultaneously excited in-phase with the same magnitude RF signal. As shown in these graphs, the antenna beam has a quasi-omnidirectional shape in the azimuth plane and has a relatively narrow elevation beamwidth.

It is anticipated that the base station antenna 100 may exhibit relatively good performance. The base station antenna 100, however, may be larger and/or more expensive than desirable for some applications. In particular, the base station antenna 100 requires a total of six linear arrays 120 with a total of thirty-six radiating elements 122. Such an antenna may be relatively expensive. Additionally, the radome for the antenna 100 will have a diameter on the order of 12 inches. A smaller diameter radome would be desirable for many small cell applications, as the utility poles on which small cell base station antennas are commonly mounted typically have a diameter of less than a foot. Moreover, as can be seen in FIG. 5A, there are three deep nulls in the azimuth plane that are located at the corners of the triangular reflector assembly 110. Each of these nulls is about 15 dBi below the peak gain value. While beam-forming techniques may reduce the depth of these nulls, it still may be difficult to provide coverage for users located in the directions of these nulls, particularly for users that are at larger distances from the antenna 100.

The base station antenna 100 may be connected to a twelve-port beam-forming radio and may operate as a beam-forming antenna and/or as a MIMO antenna. The discussion below of a beam-forming base station antenna 200 explains how antennas according to embodiments of the present invention may be used in conjunction with an eight-port beam-forming radio to provide an antenna that can operate in beam-forming and/or in MIMO modes of operation. The base station antenna 100 would operate in an essentially identical manner, with the only difference being that base station antenna 100 is a twelve port antenna that works in conjunction with a twelve-port beam-forming radio while base station antenna 200 is an eight-port antenna that works in conjunction with an eight-port beam-forming radio. Accordingly, further discussion of the operation of base station antenna 100 will be omitted.

Figure 6A:
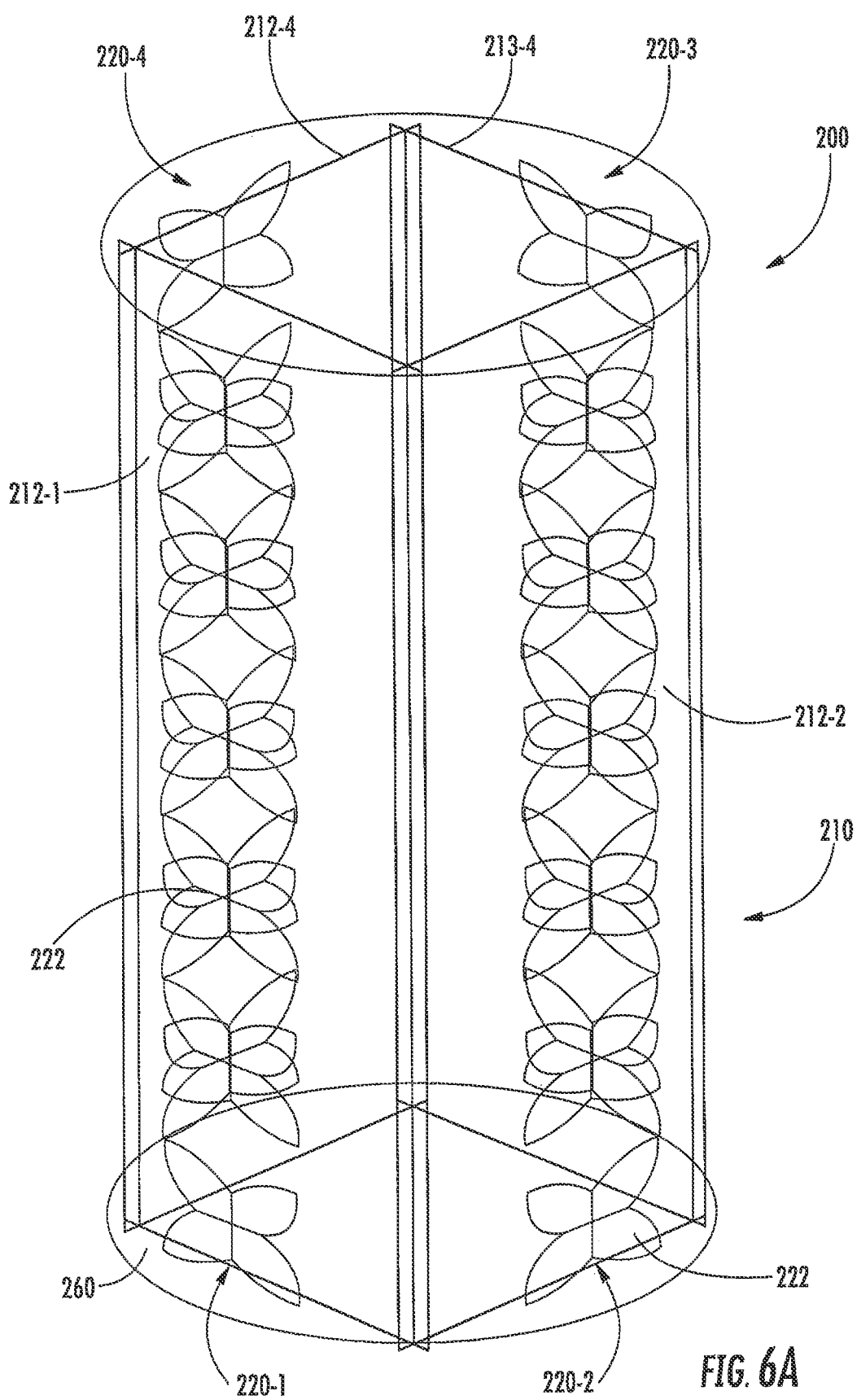
FIG. 6A is a schematic diagram illustrating a small cell base station antenna according to embodiments of the present invention.

FIG. 6A is a schematic perspective diagram illustrating a beam-forming base station antenna 200 according to further embodiments of the present invention that is suitable for use as a small cell antenna. As shown in FIG. 6A, the small cell base station antenna 200 includes a rectangular tubular reflector assembly 210. The base station antenna 200 includes four linear arrays 220-1 through 220-4 of dual-polarized radiating elements 222. Each face of the reflector assembly 210 may comprise a backplane 212-1 through 212-4. Each backplane 212 may comprise a unitary structure or may comprise a plurality of structures that are attached together. Each backplane 212 may comprise, for example, a reflector that serves as a ground plane for the dual-polarized radiating elements 222 of the linear arrays 220 mounted thereon.

Each linear array 220 is mounted on a respective one of the backplanes 212, and may be oriented generally vertically with respect to the horizon when the base station antenna 200 is mounted for use so that each linear array 220 comprises a column of radiating elements 222. In the depicted embodiment, each linear array 220 includes a total of six radiating elements 222. It will be appreciated, however, that other numbers of radiating elements 222 may be included in the linear arrays 220. Each radiating element 222 may be implemented, for example, using the radiating element design shown in FIGS. 7A-7B. The base station antenna 200 further includes a radome 260 that covers and protects the radiating elements 222 and other components of the base station antenna 200.

Figure 7A:
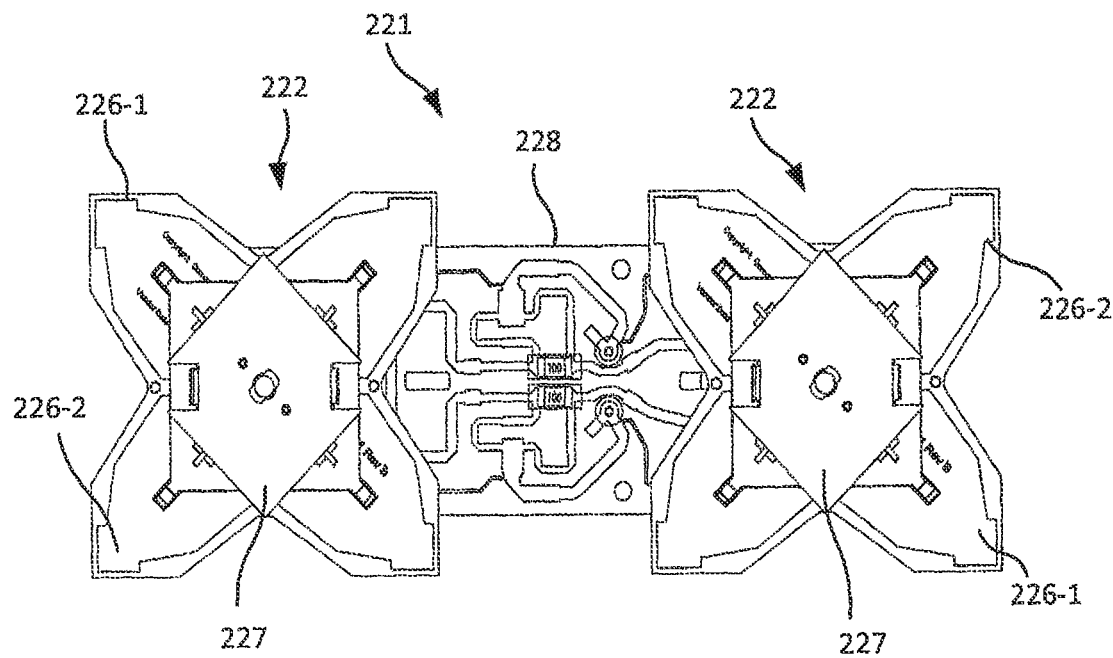
FIGS. 7A and 7B are a side view and a top view, respectively, of two of the radiating elements included in the base station antenna of FIG. 6A.
Figure 7B:
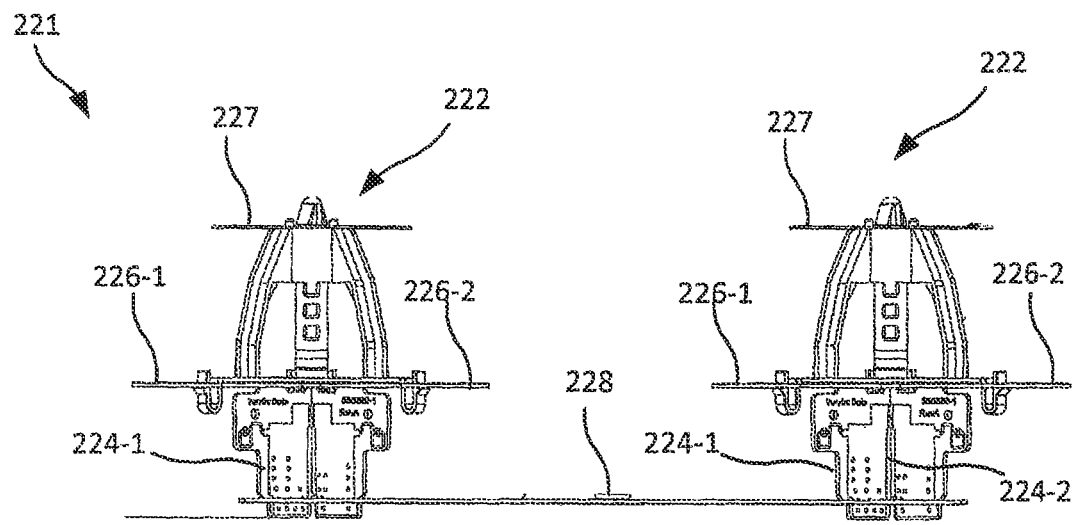

Referring to FIGS. 7A and 7B, in an example embodiment, each linear array 220 may be implemented as three sub-arrays 221 of radiating elements 222, where each sub-array 221 includes two radiating elements 222 that are mounted on a common feedboard 228. It will be appreciated, however, that sub-arrays 221 may or may not be used in other embodiments, and that any appropriate radiating elements 222 may be used. It will also be appreciated that different types of radiating elements 222 may be more suitable for different frequency bands of operation.

As is further shown in FIGS. 7A and 7B, each radiating element 222 may comprise a pair of stalks 224-1, 224-2 and a pair of radiators 226-1, 226-2. Each stalk 224 may comprise a microstrip printed circuit board. The two printed circuit boards that form the stalks 224-1, 224-2 may be arranged in an "X" configuration when viewed from above. Each radiator 226 may comprise, for example, a dipole. Each radiator 226 may have a directional pattern in the azimuth plane having, for example, azimuth half power beamwidths of between 50°-120°. In the depicted embodiment, the base station antenna 200 is a dual-polarized antenna, and hence each radiating element 222 includes a pair of dipole radiators 226 arranged in a so-called "cross-dipole" arrangement, with the first radiator 226 being disposed at an angle of −45° from a vertical axis, and the second radiator 226 being disposed at an angle of +45° from the vertical axis. Each radiator (dipole) 226 may be disposed in a plane that is substantially perpendicular to a longitudinal axis of its corresponding stalk 224. In some embodiments, both radiators 226-1, 226-2 may be formed on a common printed circuit board. In the depicted embodiment, each sub-array 221 includes a pair of radiating elements 222 that are mounted on a feedboard 228. The feedboard 228 may be configured to split an RF signal (the split need not be equal) that is provided thereto into two sub-components and to feed each sub-component to a respective one of the radiating elements 222. The feedboard 228 may include two inputs, namely one for each polarization. Directors 227 may be mounted above the radiators 226 to narrow the beamwidth of the radiating elements 222.

Figure 8:
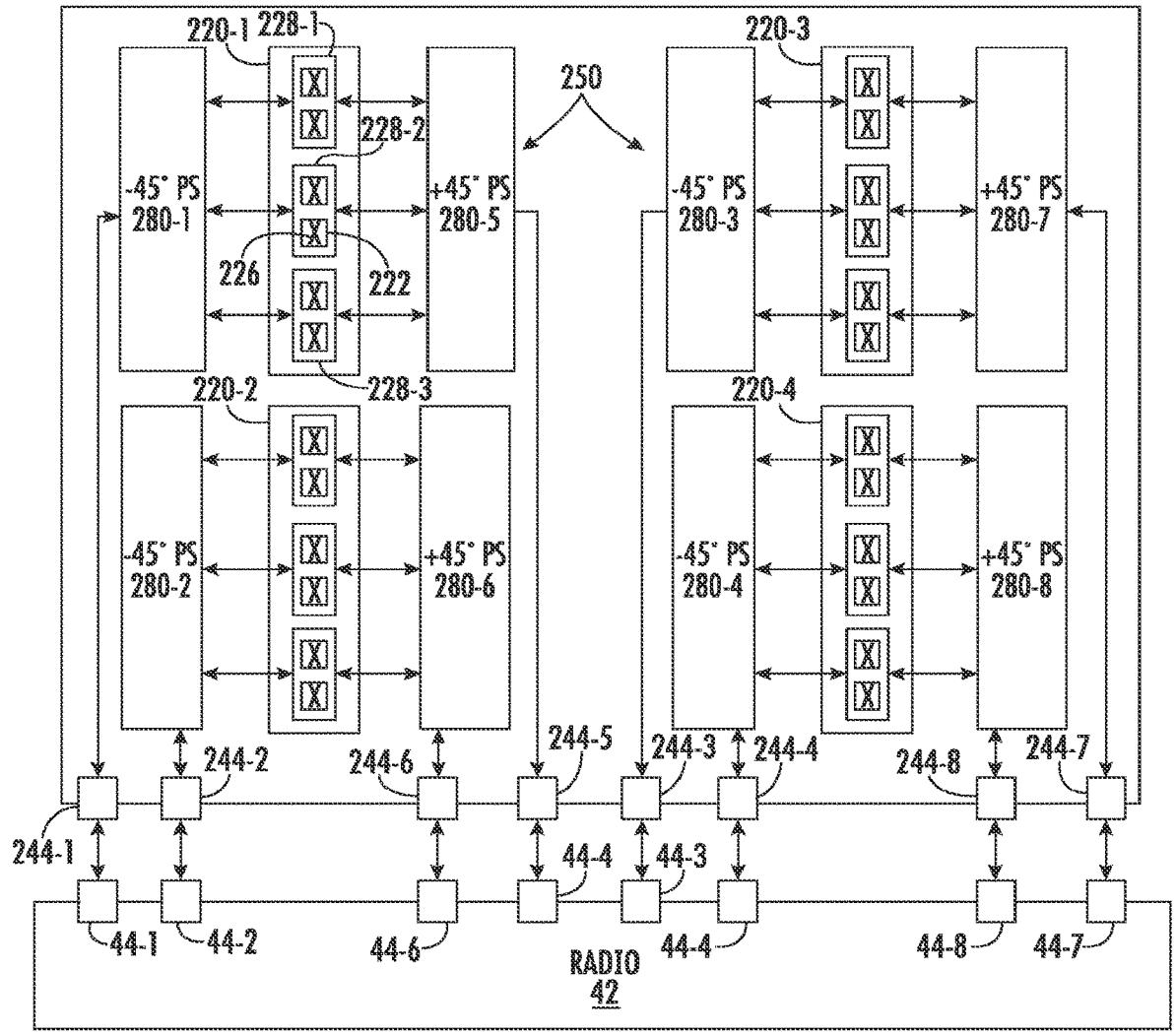
FIG. 8 is a block diagram illustrating a feed network that may be included in the base station antenna of FIG. 6A.

FIG. 8 illustrates an embodiment of a feed network 250 that may be used to pass RF signals between eight RF connector ports 244 (also referred to herein simply as "ports") on base station antenna 200 and the radiating elements 222 of the four linear arrays 220. FIG. 8 also illustrates the connections between the ports 244 on base station antenna 200 and the corresponding radio ports 44-1 through 44-8 on a conventional beam-forming radio 42.

As shown in FIG. 8, the base station antenna 200 is an eight port antenna having ports 244-1 through 244-8. While not shown in FIG. 8, the base station antenna 200 may also have a calibration port that is used to calibrate a radio so that it can generate amplitude and phase weights that will provide desired amplitude and phase shifts between the linear arrays 220. Ports 244-1 through 244-4 are coupled to the −45° dipoles of the respective linear arrays 220-1 through 220-4, and ports 244-5 through 244-8 are coupled to the +45° dipoles of the respective linear arrays 220-1 through 220-4. Duplexing of the transmit and receive channels is performed internal to the radio 42 in this particular embodiment.

As shown in FIG. 8, the first port 244-1 is coupled to an input of phase shifter 280-1. The phase shifter 280-1 may split the RF signals input thereto three ways (and the power split may be equal or unequal) and may apply a phase taper across the three sub-components of the split RF signal to apply an electronic downtilt to the antenna beam that is formed when the sub-components of the RF signal are transmitted (or received) through the linear array 220-1. The three outputs of phase shifter 280-1 are coupled to the −45° polarization transmission lines on the three feed assemblies 228-1 through 228-3 of linear array 220-1. The −45° polarization transmission lines on each feed assembly 228 include a power splitter (not shown) and the two outputs of each such power splitter connect to the respective −45° polarization radiators 226 of the radiating elements 222 of the respective feed assemblies 228. Thus, an RF signal input at port 244-1 may be split into several sub-components and then phase shifted, and the phase shifted sub-components may be split again and fed to the six dipoles 226 of linear array 220-1 that are arranged to radiate at the −45° polarization. The power splitting performed by the phase shifter 280-1 and on the feedboard assemblies 228 may be equal or unequal power splitting. The number of phase shifter outputs may be different than three. In some embodiments, the phase shifters 280 may be integrated onto a monolithic printed circuit board that contains all the radiating elements, eliminating the need for cables between the phase shifter outputs and the feedboards 228.

Similarly, the fifth port 244-5 is coupled to an input of phase shifter 280-5. The phase shifter 280-5 may split the RF signals input thereto three ways (and the power split may be equal or unequal) and may apply a phase taper across the three sub-components of the split RF signal to, for example, apply an electronic downtilt to the antenna beam that is formed when the sub-components of the RF signal are transmitted (or received) through the linear array 220-1. The three outputs of phase shifter 280-5 are coupled to the +45° polarization transmission lines on the three feed assemblies 228-1 through 228-3 of linear array 220-1. The +45° polarization transmission lines on each feed assembly 228 include a power splitter (not shown) and the two outputs of each such power splitter connect to the respective +45° polarization radiators 226 of the radiating elements 222 of the respective feed assemblies 228. Thus, an RF signal input at port 244-5 may be split into several sub-components and then phase shifted, and the phase shifted sub-components may be split again and fed to the six dipoles 226 of linear array 220-1 that are arranged to radiate at the +45° polarization.

As shown in FIG. 8, identical feed arrangements may be used to feed the radiating elements 222 of linear arrays 220-2 through 220-4 via phase shifters 280-2 through 280-4 and 280-6 through 280-8. Therefore, further description of these portions of the feed network 250 will be omitted. It will also be appreciated that the phase shifters 280 may be omitted in some embodiments, and the RF signals may be split on the feedboard assemblies 228 and coupled to the radiating elements 222. It will likewise be appreciated that the feedboard assemblies may be omitted in some embodiments and that the radiating elements may be directly fed by cables that are, for example attached to junction boxes. For example, if die-cast metal dipoles are used as the radiating elements, the dipoles may be directly fed by coaxial cables in example embodiments. Thus, it will be appreciated that any appropriate feed network and radiating elements may be used, including feed networks that directly feed each radiating element without the use of any feedboard assemblies.

While FIG. 8 (as well as FIGS. 7A-7B) illustrate an embodiment in which two radiating elements 222 are mounted per feedboard 228, it will be understood that any number of radiating elements 222 may be provided per feedboard 228. For example, in another embodiment, all six radiating elements 222 may be provided on a single feedboard 228 that could include the phase shifters 280-1 and 280-5 (or, alternatively, the phase shifters 280 could be omitted) while in other embodiments each radiating element 222 could be implemented individually and have a direct connection to outputs of the phase shifters 280-1, 280-5. Manufacturing issues, cost, and the number of radiating elements 222 that can be individually phase adjusted (assuming that phase shifting for electronic downtilt control is provided) may be considered in selecting a particular design.

The base station antenna 200 may further include a number of conventional components that are not depicted in FIG. 6A or 8. For example, a plurality of circuit elements and other structures may be mounted within the reflector assembly 210. These circuit elements and other structures may include, for example, remote electronic tilt (RET) actuators for mechanically adjusting the phase shifters 280, mechanical linkages and one or more controllers. The antenna 200 may include top and bottom end caps, and the connector ports 244 may be mounted in the bottom end cap. Mounting brackets (not shown) may also be provided for mounting the base station antenna 200 to another structure such as an antenna tower or utility pole.

FIGS. 6B-6J are graphs illustrating example beam patterns that may be formed using the small cell antenna 200.

Figure 6B:
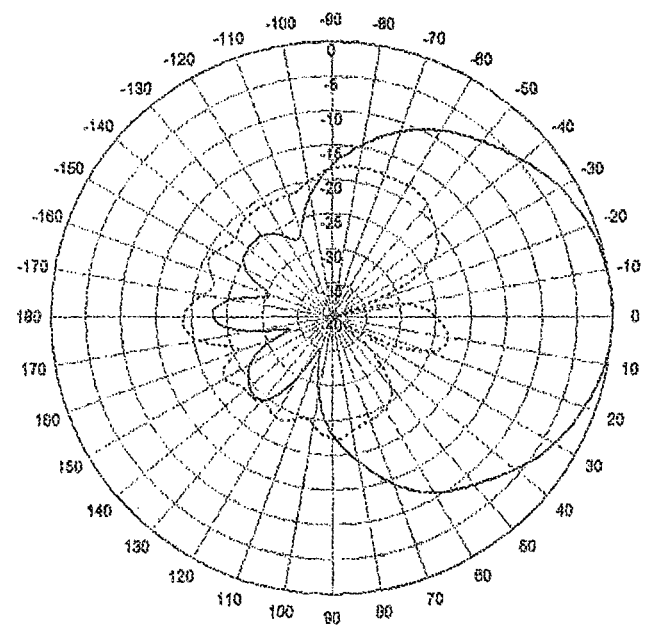
FIGS. 6B-6J are graphs illustrating azimuth or elevation cross-sections of antenna beams that may be generated by exciting various columns or combinations of columns of the small cell antenna of FIG. 6A.
Figure 6C:
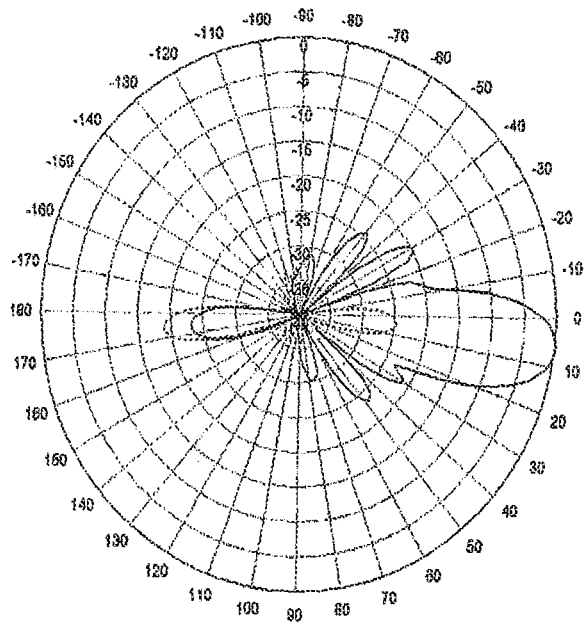

FIGS. 6B and 6C illustrate the azimuth and elevation patterns for antenna 200 when an RF signal is applied to a single port 244 of the antenna, and hence is supplied to the radiators 226 having the first polarization of only one of the four linear arrays 220 (FIG. 6B illustrates the case when the RF signal is fed to linear array 220-1, which has an azimuth boresight angle of 0 degrees). As shown in FIG. 6B, the antenna beam has an azimuth half power beamwidth of about 60-65 degrees. As shown in FIG. 6C, the elevation pattern has a downtilt of about 5 degrees, and an elevation half power beamwidth of about 7 degrees.

Figure 6D:
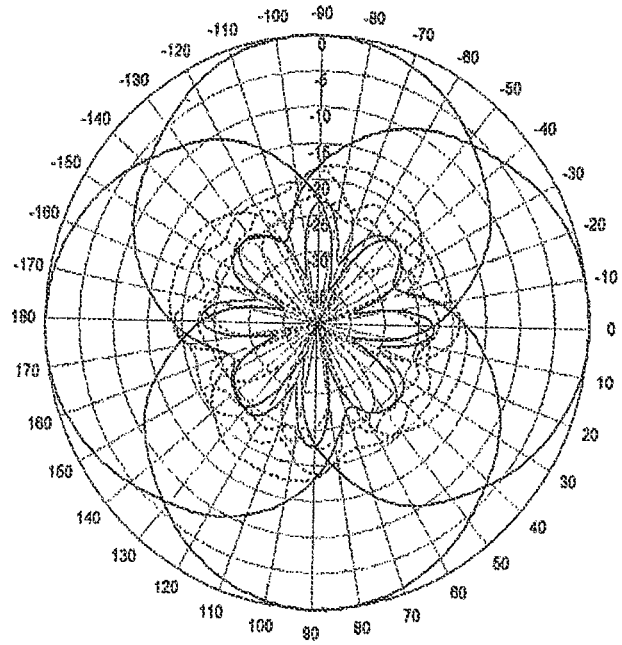

FIG. 6D is a composite antenna pattern that illustrates the azimuth pattern of FIG. 6B along with the azimuth patterns that are generated when a port that is connected to each of the other three linear arrays 220 are excited by themselves. As can be seen, each linear array 220 generates a similar azimuth beam pattern, except that the azimuth boresight for each beam pattern is offset by 90 degrees from the beam patterns formed by the two adjacent linear arrays 220. While the elevation patterns corresponding to the azimuth patterns with boresight pointing directions of 90°, 180° and 270° in FIG. 6D are not shown in the drawings, they are substantially identical to the elevation pattern of FIG. 6C.

Figure 6E:
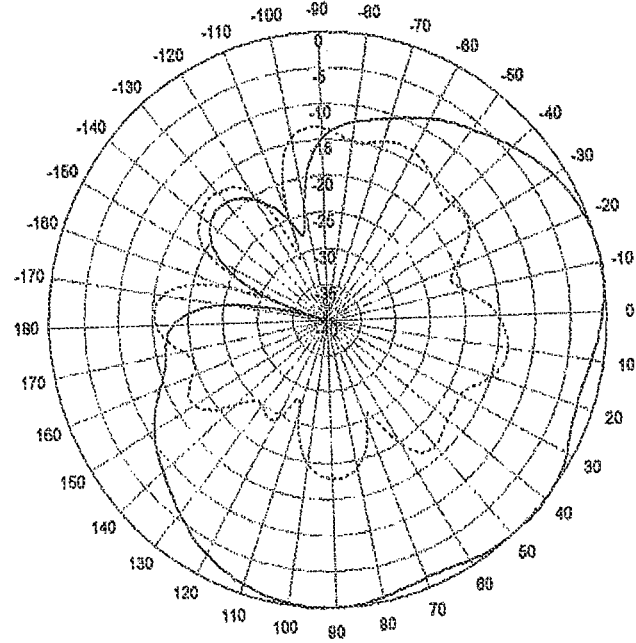
Figure 6F:
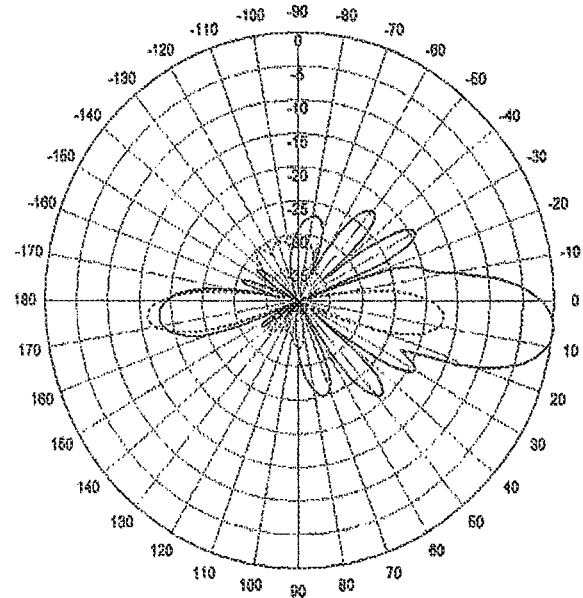
Figure 6G:
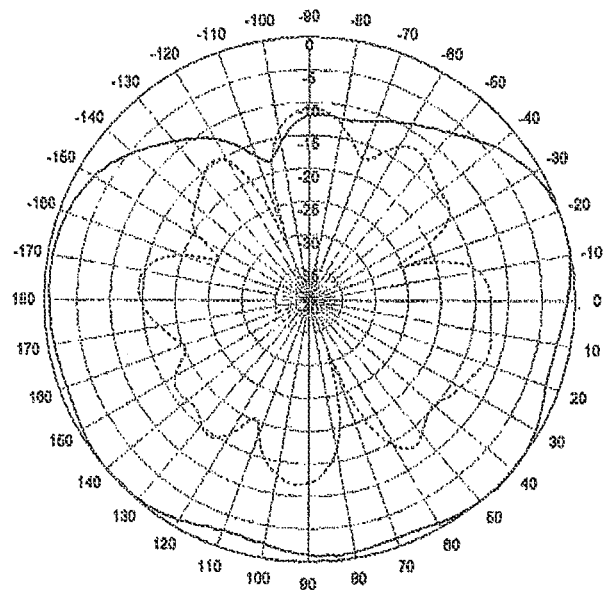
Figure 6H:
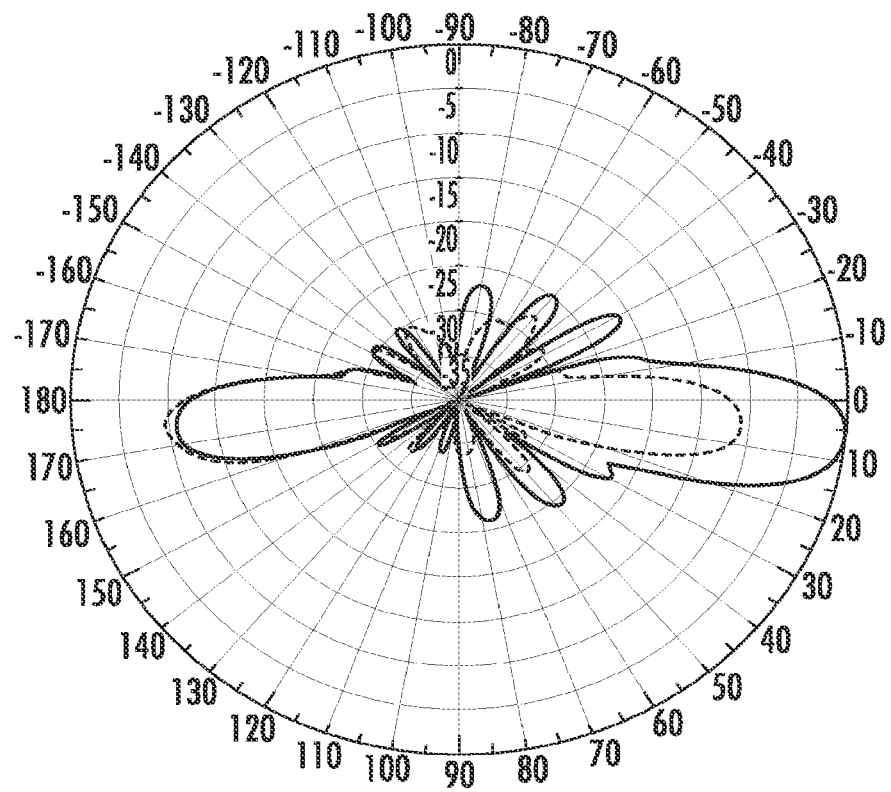
Figure 6I:
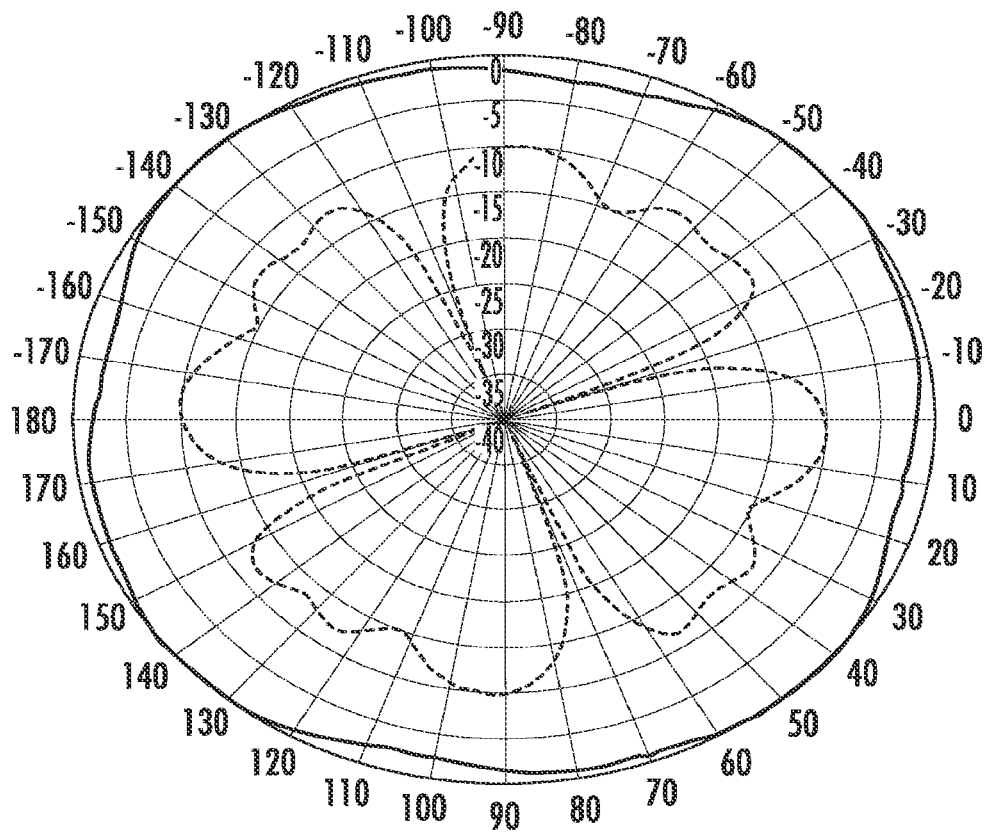
Figure 6J:
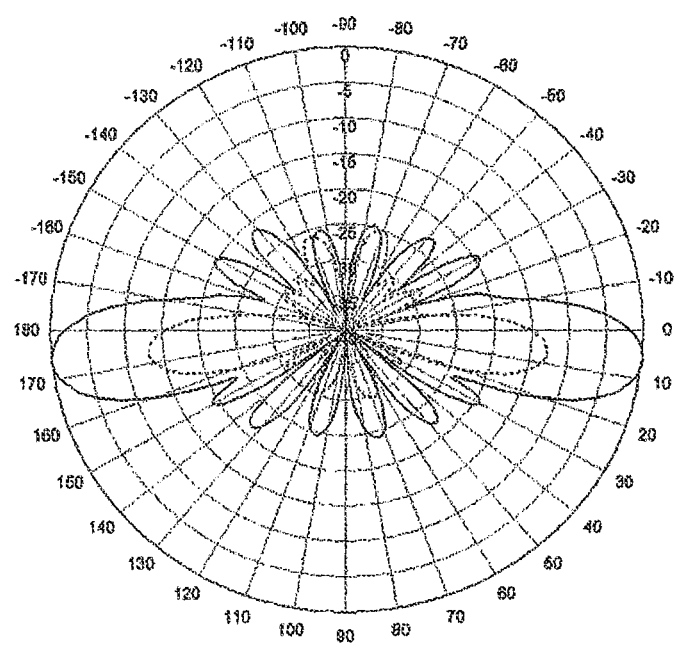

In many cases, it may be advantageous to use two of the linear arrays 220 to form a narrowed antenna beam in the azimuth plane. FIGS. 6E and 6F illustrate the azimuth and elevation patterns for antenna 200 when an RF signal is applied to the ports of the antenna that connect to the linear arrays that have azimuth boresight pointing directions of 0° and 90°. In the case of FIGS. 6E and 6F, the signals that are supplied to the two ports are not amplitude or phase weighted, and hence the resultant azimuth pattern provides hemispherical coverage in the azimuth plane. It will be appreciated, however, that by amplitude and phase weighting the RF signals that are supplied to the two ports, the antenna beam may be narrowed in the azimuth plane. FIGS. 6G and 6H illustrate the azimuth and elevation patterns for antenna 200 when an RF signal is applied (without amplitude or phase weighting) to the three ports of the antenna that connect to the linear arrays 220 that have azimuth boresight pointing directions of 0°, 90° and 180°. Finally, FIGS. 6I and 6J illustrate the azimuth and elevation patterns for antenna 200 when an RF signal is applied (without amplitude or phase weighting) to all four linear arrays 220 of the antenna. 200 As can readily be seen, the antenna 200 is capable of providing omnidirectional coverage in the azimuth plane.

As noted above, eight-port beam-forming antennas are known in the art, but these antennas are normally implemented as panel antennas that have four columns (linear arrays) of dual-polarized radiating elements, where all four columns point in the same direction (i.e., have the same azimuth pointing angle). Such antennas, however, are not well-suited for many small cell applications in dense urban environments where antennas having omnidirectional coverage are often preferred so that a single base station antenna can provide coverage to the small cell. Omnidirectional beam-forming antennas are also known in the art, but these antennas used omnidirectional radiating elements that had low gain and limited beam-forming capabilities. As shown above, the base station antenna 200 is capable of providing omnidirectional coverage while using directional radiating elements (i.e., radiating elements that provide less than 360° coverage in the azimuth plane) may allow for narrower antenna beams that have much higher gain. As will be explained in greater detail below, the antenna 200 may be used as a beam-forming antenna and/or as a MIMO antenna. Moreover, when used in LTE-TM8 beam-forming mode, the base station antenna 200 may operate in conjunction with an off-the-shelf LTE-TDD eight-port beam-forming radio that will use digital beam-forming techniques to optimize the amplitude and phase weights that are applied to the signals received at each port 244 of the antenna 200. The off-the-shelf radio may also calculate the complex conjugates of the optimized weights for the uplink to generate corresponding amplitude and phase weights for each port 244 on the downlink.

The base station antenna 200 may be relatively small, having a diameter on the order of 8 inches and a height of about two feet for an antenna operating in the 2 GHz frequency range. Such an antenna may be readily mounted on most utility poles and streetlights, and given its small diameter, the antenna 200 may blend together with the pole so that it is not a visual blight. Moreover, in urban environments, there are typically a small number of entities that own the utility poles such as an electric power company, a government entity (e.g., for streetlights), and a landline telephone company. As such, deploying small cell base station antenna that are utility pole mountable—such as the base station antenna 200—may be advantageous since a cellular operator can reach a leasing agreement with one or two entities to obtain locations for mounting small cell base station antennas throughout the urban area. In contrast, panel beam-forming antennas are typically only "stealthy" if mounted on walls or buildings. Typically, a cellular operator will need to lease mounting locations on walls/buildings one or a few at a time, which makes the transactional costs of the leasing negotiations much higher.

With beam-forming antennas, it is typically desirable to reduce the horizontal spacing between adjacent linear arrays in order to reduce sidelobes in the antenna pattern and increase the directivity of the antenna beam. Typically, a horizontal spacing of about 0.5 wavelengths is desirable for beam-forming antennas. In contrast, when MIMO transmission techniques are used, it is necessary that the linear arrays transmitting different data streams be relatively decorrelated. Two techniques that are routinely used to achieve such decorrelation are polarization diversity and spatial diversity. Cross-polarized signals may achieve high levels of decorrelation, although these levels may be reduced somewhat in high-scattering environments. Spatial diversity is achieved by physically spacing the linear arrays apart. Typically, a horizontal (azimuth plane) spacing of a wavelength or more is desired for MIMO antennas. However, the necessary spacing is reduced the more cluttered (high scattering) the environment. Small cell antennas are typically used in urban environments that have high degrees of scattering, and hence sufficient decorrelation may be achieved even when the linear arrays are relatively close together.

Here, the linear arrays 220 of base station antenna 200 may be located in close proximity for purposes of beam-forming. Since the azimuth boresight pointing direction of each linear array 220 is different, the linear arrays 220 may be sufficiently decorrelated, particularly when the antenna 200 is deployed in a dense urban environment. As such, the small cell base station antenna 200 may be used as both a beam-forming antenna and a MIMO antenna in some applications. In particular, MIMO techniques may be used to break up data that is to be transmitted to a user into a plurality of independent data streams, and each of these data streams is transmitted to the user via either two or four of the linear arrays. For example, the antenna 200 may transmit signals using 2×MIMO techniques by transmitting a first data stream through the four linear arrays 220 at a first polarization while simultaneously transmitting a second data stream through the four linear arrays 220 at a second polarization (with both transmissions at the same frequency).

The base station antenna 200 may be well-suited for operation in LTE-TDD and LTE-FDD systems. In some embodiments, the base station antenna 200 may be used in LTE-TDD TM8 mode or LTE-FDD TM8 mode. In particular, the base station antenna 200 may be used in conjunction with a standard off-the-shelf eight port beam-forming radio 42 to operate in LTE-TDD TM8 mode as follows.

During a particular time slot, an RF signal that is transmitted by the user assigned to the time slot is received at the antenna 200. This RF signal may be received at the −45° dipoles and the +45° dipoles of all four linear arrays 220-1 through 220-4. The magnitude and phase of the sub-components of the RF signal that are received at each linear array 220 (and at the radiating elements 222 of each linear array 220) will differ due to differences in transmission path lengths, fading, the azimuth pointing direction of each array and various other factors. Multiple versions of the transmitted RF signal may be received at one or more of the linear arrays 220 due to signal reflections off buildings, terrain features or the like that result in multipath transmission. The signals received at each of the eight linear arrays 220 are fed to the beam-forming radio 42. The beam-forming radio 42 uses an optimization algorithm to determine amplitude and phase weights to apply to the signals received at each port 244-1 through 244-8 that optimize some performance parameter such as signal-to-noise ratio, bit error rate or the like. The optimization algorithm may be, for example, an interference rejection combining or maximum ratio combining optimization algorithm. The beam-forming radio 42 applies the amplitude and phase weights determined by the optimization algorithm in demodulating the received RF signal. This technique is known in the art as digital beam-forming.

The beam-forming radio 42 may determine the complex conjugates of the amplitude and phase weights that maximize the performance parameter for the received (uplink) signal and may use these complex conjugates as the amplitude and phase weights for transmitting RF signals through the linear arrays 220 on the downlink.

The beam-forming radio 42 may determine amplitude and phase weights to apply to the signals received at each port 244-1 through 244-8 for each time slot in a frame structure of a TDD transmission system. The radio 42 may communicate with a different user (or set of users) during each time slot in the frame. The radio 42 will periodically perform channel sampling operations to determine the state of the channel(s) between the base station antenna and the user served during a particular time slot. Based on the results of the channel sampling, the radio 42 may for example, transmit data to a particular user using beam-forming alone, using beam-forming in conjunction with 2×MIMO transmission techniques or using beam-forming in conjunction with 4×MIMO transmission techniques. The radio 42 will periodically perform additional channel sampling to determine if the channel characteristics during each time slot have changed and revise the transmission techniques used based on the updated channel characteristics.

It will also be appreciated that the base station antennas according to embodiments of the present invention may further include a calibration port and one or more calibration elements. In some embodiments, the calibration element may comprise, for example, a distributed calibration element that may receive signals transmitted by each of the linear arrays of radiating elements. An example of a suitable distributed calibration element is a leaky coaxial cable. The radio may transmit calibration signals that are transmitted through one or more of the linear arrays of the antenna. A different calibration signal may be transmitted through each linear array. The one or more calibration elements may receive the calibration signals and pass the received calibration signals to the radio through the calibration port of the base station antenna. The radio may determine the amplitude and phases of the received calibration signals so that the amplitude and phase weights may be calibrated to more exactly control the amplitude and phase shifts between the linear arrays.

Figure 9:
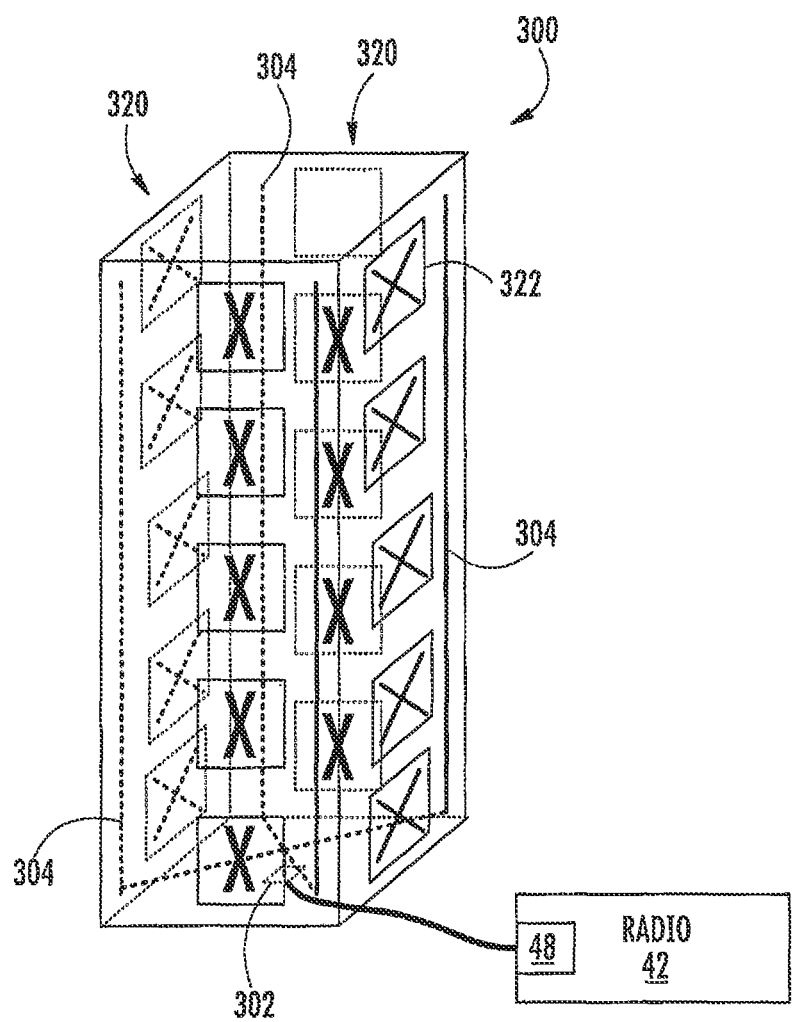
FIG. 9 is a block diagram of a base station antenna according to embodiments of the present invention that has a calibration port and a distributed calibration element.

FIG. 9 is a block diagram of a base station antenna 300 according to embodiments of the present invention that has a calibration port 302 and a distributed calibration element 304. As shown in FIG. 9, the distributed calibration element 304 may be positioned to receive RF signals that are transmitted through each of the linear arrays 320 of dual-polarized radiating elements 322. The signals received through the distributed calibration element 304 are passed to the calibration port 302 and then passed to a calibration port 48 on a radio 42. Each calibration signal (i.e., the calibration signals transmitted through the different linear arrays 320) may be transmitted at a different frequency or may include a unique code so that the receiver at the radio 42 can differentiate between the calibration signals to determine the phase shifts therebetween. The radio 42 may use this information to ensure that the amplitude and phase weights that are applied to the RF signals transmitted to the various linear arrays 320 provide optimized antenna beams.

Figure 10:
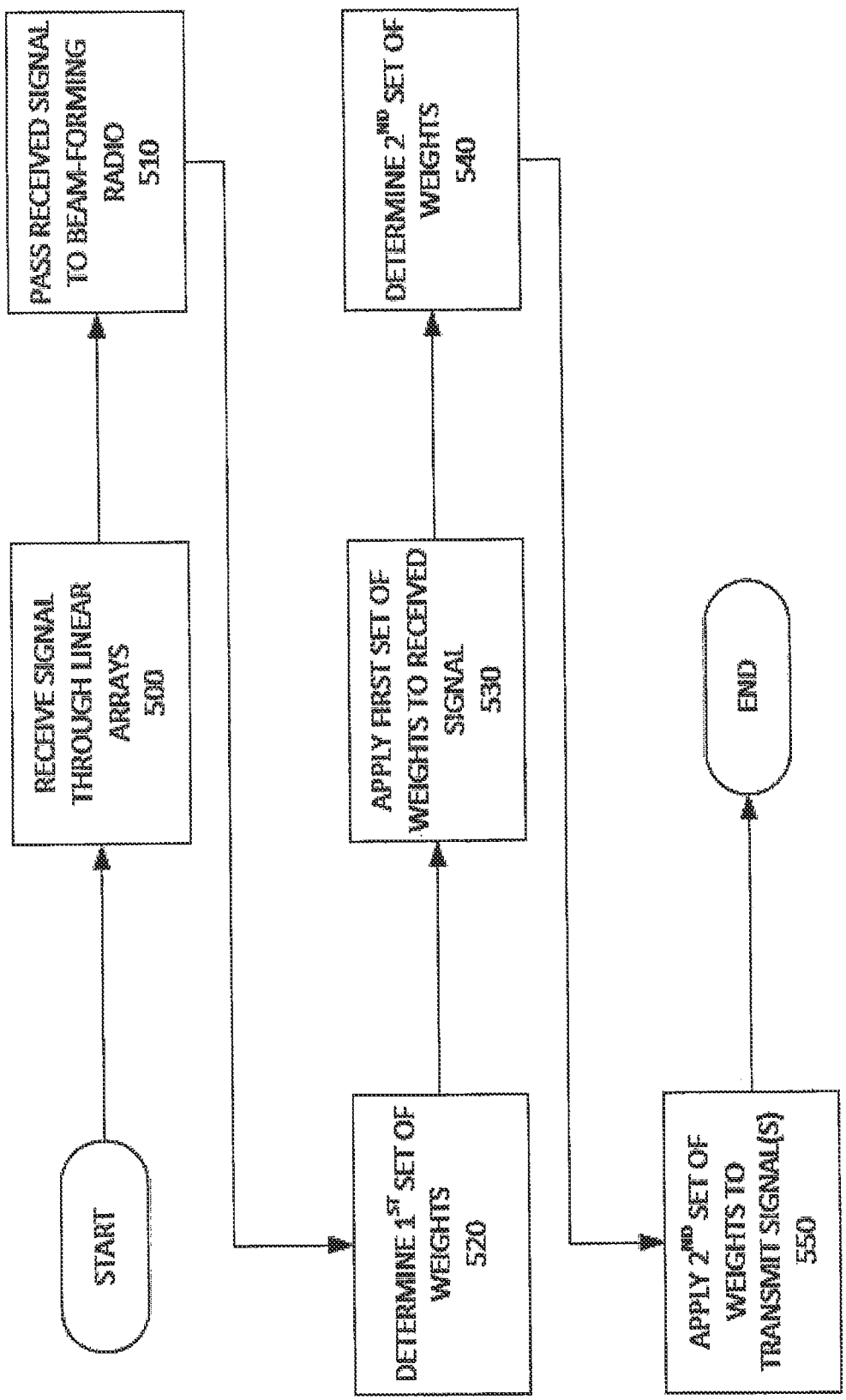
FIG. 10 is a flow chart diagram illustrating a method of operating a base station antenna according to embodiments of the present invention.

FIG. 10 is a flow chart diagram illustrating a method of operating a base station antenna according to embodiments of the present invention. The base station antenna includes a plurality of linear arrays of dual-polarized radiating elements, where at least two of the linear arrays have different azimuth boresight pointing directions. As shown in FIG. 10, operations may begin with the reception of an RF signal from a user through the plurality of linear arrays during a first time slot of a time division multiplex system (Block 500). This received RF signal is passed to a beam-forming radio (Block 510). A first set of amplitude and phase weights are then determined, the first set of amplitude and phase weights including a respective amplitude weight and a respective phase weight for each linear array at each of a first polarization and a second polarization (Block 520). The first set of amplitude and phase weights may then be applied to the received RF signal (Block 530). A second set of amplitude and phase weights may then be determined, the second set of amplitude and phase weights including a respective amplitude weight and a respective phase weight for each linear array at each of the first polarization and the second polarization (Block 540). The amplitude and phase weights in the second set of amplitude and phase weights may be the complex conjugates of the amplitude and phase weights in the first set of amplitude and phase weights. The second set of amplitude and phase weights may then be applied to one or more RF signals that are transmitted to the user through the plurality of linear arrays (Block 550).

Figure 11:
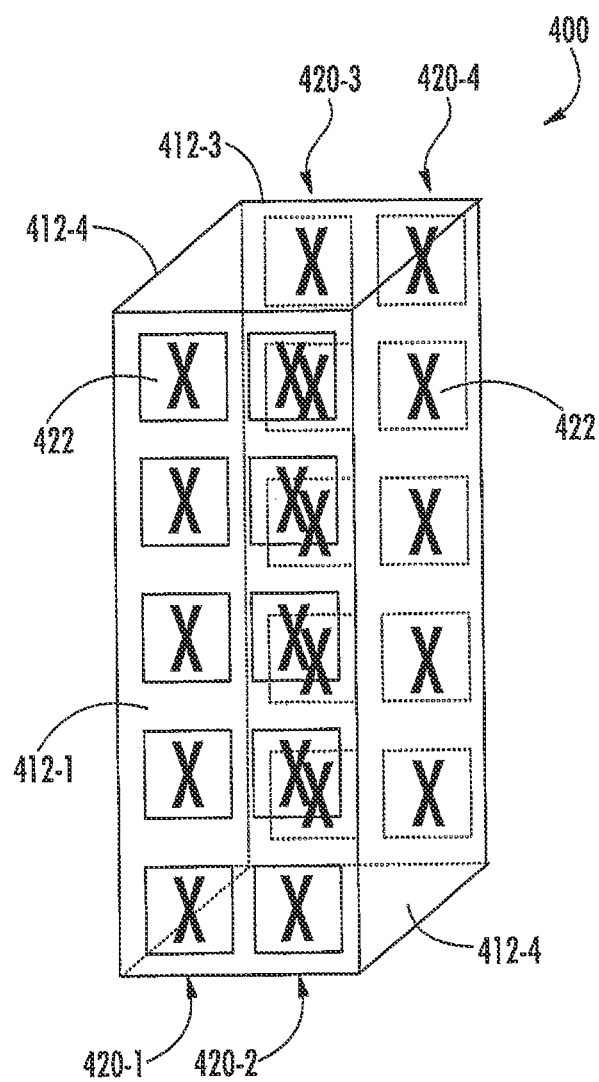
FIG. 11 is a schematic perspective view of a small cell base station antenna according to further embodiments of the present invention.

FIG. 11 is a schematic perspective view of a base station antenna 400 according to further embodiments of the present invention. The antenna 400 is similar to the antenna 200 that is described above with reference to FIGS. 6A-8, except that linear arrays 420-1 and 420-2 of radiating elements 422 are mounted on a first backplane 412-1, while linear arrays 420-3 and 420-4 of radiating elements 422 included in the antenna 400 are mounted on a third backplane 412-3, and no linear arrays are mounted on backplane 412-2 or backplane 412-4. The third backplane 412-3 is opposite the first backplane 412-1. In other words, the two antennas 200 and 400 may be identical except for the locations of the linear arrays 420 on the backplanes 412. The antenna 400 may be a bi-directional antenna that is well-suited for use in tunnels, for outside coverage along city streets and the like where coverage is only need generally along a longitudinal axis as opposed to the omnidirectional coverage provided by antenna 200. The antenna 400 may comprise an eight-port antenna that connects to an eight-port beam-forming radio 42. The ports are not illustrated in FIG. 11 to simplify the drawing, but may be identical to the ports 244 of base station antenna 200. The antenna 400 may further include a calibration port. The antenna 400 may be capable of generating narrower, higher gain beams than the antenna 200, since two linear arrays 420 are mounted side-by-side on a backplane (i.e., on backplane 412-1, and also on backplane 412-3).

It will appreciated that many modifications may be made to the antennas described above without departing from the scope of the present invention. For example, the base station antenna 200 includes four linear arrays 220 that are mounted on the four sides of a support structure that has a square horizontal cross-section. In other embodiments, a base station antenna may be provided that is identical to the base station antenna 200 except that it includes five linear arrays that are mounted on a support structure having a pentagon-shaped horizontal cross-section. In still other embodiments, a base station antenna may be provided that is identical to the base station antenna 200 except that it includes six linear arrays that are mounted on a support structure having a hexagonal horizontal cross-section.

The present invention has been described above with reference to the accompanying drawings. The invention is not limited to the illustrated embodiments; rather, these embodiments are intended to fully and completely disclose the invention to those skilled in this art. In the drawings, like numbers refer to like elements throughout. Thicknesses and dimensions of some elements may not be to scale.

Spatially relative terms, such as "under", "below", "lower", "over", "upper", "top", "bottom" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity. As used herein the expression "and/or" includes any and all combinations of one or more of the associated listed items.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

That which is claimed is:

1. A small cell base station, comprising:
a base station antenna comprising:
first through fourth linear arrays of dual-polarized radiating elements, where the first linear array points in a first direction, the third linear array points in a third direction that is substantially opposite the first direction, the second linear array points in a second direction, and the fourth linear array points in a fourth direction that is substantially opposite the second direction;
first through eighth phase shifters; and
first through eighth ports, where each of the first through fourth linear arrays is connected to a respective pair of the first through eighth ports through a respective pair of the first through eighth phase shifters; and
a time division duplex beamforming radio having first through eighth radio ports that are connected to the respective first through eighth ports of the base station antenna,
wherein the first direction is angularly offset from the second direction by about 90 degrees, and
where each of the first through eighth phase shifters is configured to split an RF signal output to the respective phase shifter from the beamforming radio into a plurality of sub-components and to apply a phase taper across the plurality of sub-components.

2. The base station of claim 1, wherein an azimuth boresight pointing direction of the first linear array is offset from azimuth boresight pointing directions of the second through fourth linear arrays by about 90°, about 180° and about 270°, respectively.

3. A small cell base station, comprising:
a base station antenna comprising:
first through fourth linear arrays of dual-polarized radiating elements, where the first linear array points in a first direction, the third linear array points in a third direction that is substantially opposite the first direction, the second linear array points in a second direction, and the fourth linear array points in a fourth direction that is substantially opposite the second direction; and
first through eighth ports, where each of the first through fourth linear arrays is connected to a respective pair of the first through eighth ports; and
a time division duplex beamforming radio having first through eighth radio ports that are connected to the respective first through eighth ports of the base station antenna,
wherein the first direction is angularly offset from the second direction by about 90 degrees,
wherein the beamforming radio is configured to determine and apply a first set of amplitude and phase weights to radio frequency ("RF") signals that are received from the respective first through eighth ports of the base station antenna, and to apply a second set of amplitude and phase weights to RF signals that are output by the radio to the first through eighth ports of the base station antenna, where the second set of amplitude and phase weights is different from the first set of amplitude and phase weights.

4. The base station of claim 3, wherein the amplitude and phase weights of the first set of amplitude and phase weights and the amplitude and phase weights of the second set of amplitude and phase weights are each determined on a time slot-by-time slot basis.

5. The base station of claim 3, wherein the amplitude and phase weights of the second set of amplitude and phase weights are the complex conjugates of the respective amplitude and phase weights of the first set of amplitude and phase weights.

6. The base station of claim 1, wherein the base station antenna is configured to transmit as a multi-input-multi-output antenna using first radiators of the dual polarized radiating elements to transmit a first data stream and using the second radiators of the dual polarized radiating elements to simultaneously transmit a second data stream that is different than the first data stream.

7. The base station of claim 6, wherein the first and second data streams are part of a composite data stream that is transmitted to a user.

8. The base station of claim 1, wherein the base station antenna further includes first through fourth backplanes that together define a tubular reflector assembly.

9. The base station of claim 8, wherein the tubular reflector assembly has a generally rectangular cross-section in the azimuth plane.

10. The base station of claim 1, the base station antenna further comprising a ninth port and a calibration element that is connected to the ninth port and the radio further comprises a ninth radio port, wherein the ninth port of the base station antenna is connected to the ninth radio port.

11. The base station of claim 1, wherein the base station antenna is configured to operate in an LTE Transmission Mode 8 beamforming mode.

* * * * *